(12) United States Patent
Hulseman et al.

(10) Patent No.: US 12,370,696 B2
(45) Date of Patent: Jul. 29, 2025

(54) GRIPPING SURFACE FOR MANUFACTURED ARTICLES

(71) Applicant: Hoowaki, LLC, Greenville, SC (US)

(72) Inventors: Ralph Hulseman, Greenville, SC (US); Cameron McPherson, Easley, SC (US)

(73) Assignee: Hoowaki, LLC, Greenville, SC (US)

( * ) Notice: Subject to any disclaimer, the term of this patent is extended or adjusted under 35 U.S.C. 154(b) by 346 days.

(21) Appl. No.: 17/730,046

(22) Filed: Apr. 26, 2022

(65) Prior Publication Data

US 2022/0250254 A1    Aug. 11, 2022

Related U.S. Application Data

(63) Continuation-in-part of application No. 17/672,049, filed on Feb. 15, 2022, now abandoned, which is a continuation of application No. 17/113,623, filed on Dec. 7, 2020, now Pat. No. 11,273,557, which is a continuation of application No. 16/451,741, filed on Jun. 25, 2019, now Pat. No. 10,889,005, which is a continuation of application No. 15/674,291, filed on Aug. 10, 2017, now Pat. No. 10,377,044.

(60) Provisional application No. 62/372,896, filed on Aug. 10, 2016.

(51) Int. Cl.
*B25J 15/00* (2006.01)
*B22F 5/00* (2006.01)
*B22F 7/08* (2006.01)

(52) U.S. Cl.
CPC .............. *B25J 15/0028* (2013.01); *B22F 5/00* (2013.01); *B22F 7/08* (2013.01); *B22F 2005/005* (2013.01)

(58) Field of Classification Search
CPC . B25J 15/0028; B22F 5/00; B22F 7/08; B22F 2005/005
USPC ................................................. 428/131, 156
See application file for complete search history.

(56) References Cited

U.S. PATENT DOCUMENTS

| | | |
|---|---|---|
| 3,354,022 A | 11/1967 | Harold |
| 4,842,794 A | 6/1989 | Hovis et al. |
| 5,155,604 A | 10/1992 | Miekka et al. |
| 5,772,905 A | 6/1998 | Chou |
| 5,834,668 A | 11/1998 | Kumano et al. |
| 7,119,291 B2 | 10/2006 | Sun |
| 8,389,102 B2 * | 3/2013 | Sikora ............... B25G 1/10 428/156 |
| 8,720,047 B2 | 5/2014 | Hulseman et al. |
| 10,377,044 B2 | 8/2019 | Hulseman et al. |
| 10,458,053 B2 | 10/2019 | Hulseman et al. |

(Continued)

*Primary Examiner* — Catherine A. Simone
(74) *Attorney, Agent, or Firm* — Kim and Lahey Law Firm, LLC; Douglas W. Kim

(57) ABSTRACT

A gripping surface for a manufactured article comprising: a first pillar cluster disposed on a substate and having: a first pillar, having a first apex vector and a first draft angle defined by a first side of the first pillar and s substrate; a second draft angle defined by a second side of the first pillar and the substrate wherein the second draft angle is less than the first draft angle; and, a second pillar having a second apex vector wherein the first apex angle and the second apex angle are parallel; wherein the first pillar cluster has a triangular orientation; and, a second pillar cluster having: a first set of pillars arranged in a first concentric circle; and, a second set of pillars arranged in a second concentric circle wherein the first pillar cluster and the second pillar cluster cover less than 25% of the article.

17 Claims, 19 Drawing Sheets

(56) References Cited

U.S. PATENT DOCUMENTS

| | | |
|---|---|---|
| 10,575,667 B2 | 3/2020 | Hulseman et al. |
| 10,687,642 B2 | 6/2020 | Hulseman et al. |
| 10,758,380 B2 | 9/2020 | Bluecher et al. |
| 10,889,005 B2 | 1/2021 | Hulseman et al. |
| 11,273,557 B2 | 3/2022 | Hulseman et al. |
| 2002/0045859 A1 | 4/2002 | Gartstein et al. |
| 2008/0305305 A1 | 12/2008 | Sano et al. |
| 2010/0319183 A1 | 12/2010 | Hulseman et al. |
| 2011/0089604 A1 | 4/2011 | Hulseman et al. |
| 2013/0207793 A1 | 8/2013 | Weaber et al. |
| 2018/0043545 A1 | 2/2018 | Hulseman et al. |
| 2019/0062155 A1 | 2/2019 | Hulseman et al. |
| 2020/0338808 A1 | 10/2020 | Hulseman et al. |

\* cited by examiner

GRIPPING SURFACE FOR MANUFACTURED ARTICLES

RELATED APPLICATIONS

This application is a continuation in part of U.S. patent application Ser. No. 17/672,049 filed Feb. 15, 2022, which is a continuation of U.S. patent application Ser. No. 17/113,623 filed Dec. 7, 2020 now U.S. Pat. No. 11,273,557 issued Mar. 15, 2022, which is a continuation of U.S. patent application Ser. No. 16/451,741 filed Jun. 25, 2019 now U.S. Pat. No. 10,889,005 filed Jan. 12, 2021, which is a continuation of U.S. patent application Ser. No. 15/674,291 filed Aug. 10, 2017 now U.S. Pat. No. 10,377,044 issued Aug. 13, 2019 which is a non-provisional patent application claiming priority from U.S. Provisional Patent Application 62/372,896.

BACKGROUND OF THE INVENTION

(1) Field of the Invention

This invention is directed to a novel grip, anchoring and anti-migration surface that can include a micro surface on an article manufacture where in the articles can be used to grip polymeric, metal, or ceramic objects including films, and textiles and can be applied to medical devices or providing grip against wet biological tissue.

(2) Description of the Related Art

Medical devices are required to become smaller to provide treatment to more areas of the body such as within smaller arteries or veins; within the brain; within the gastrointestinal tract of an infant; or within the inner ear. Devices, such as self-expanding stents and implanted films are required the grip and anchor in place. However, the space available is quite limited and geometrical shapes of the implanted medical devices may be complicated. This means the devices must be thin and flexible. Films and tubing used as covers for stents or leads may be as thin as 20 to 100 μm, however, current films are slippery against wet biological tissue. Anchoring these thin devices in place to eliminate migration has proven difficult. Traditional mechanisms such sutures are difficult to apply in tight spaces. Hooks or barbs are difficult to make when small, they become ineffective when very small and may cause trauma. Once such undesirable effect is when such hooks and barbs penetrate the tissue and damage cells which can cause a healing response that can include inflammation, fluid leakage and other trauma to the tissue.

Examples of some of the technologies that have been traditionally used for thin films with gripping surfaces include U.S. Pat. Nos. 10,889,005, 10,687,642, and 10,458,053 all incorporated by reference. There have also been attempts to provide for dynamic pinning as shown in U.S. Pat. No. 11,051,567. However, this reference relies on at least two hierarchical levels with specific heights and widths making it difficult to manufacture and produce. U.S. Pat. No. 10,758,380 is directed to a stent that is very specific in its construction requiring an open weave construction, two configurations, continuous elastomeric film, surface texture, hierarchical microstructures, first microfeatures and second microfeatures with a specific relationship. Further improvements are needed to provide for increased gripping and anti-migration properties of medical devices and other applications.

Surfaces for grip have traditionally been made by coarse abrasion, bead blasting, knurling, chemical etching, engraving or laser etching. None of these methods achieve high grip and lateral friction forces that may be observed in nature such as on the feet of insects. More recently, engineered micro surfaces, manufactured by lithography techniques or micro machining techniques, have achieved superior high grip and lateral friction forces in dry, wet, soapy, or oily conditions. The shapes of the engineered surfaces have been limited to nearly vertical sides of pillar or holes shapes or pyramidal shapes by silicon wafer etching planes for lithography and to straight sides, low draft angle, pillars or slot cut shapes of available bits for micromachining. More complex shapes were achieved by making hierarchical structures of two, three, or four layers of pillars stacked on pillars, or combining layers of pillars with sinusoidal peak and valley shapes. These micro surfaces are difficult to manufacture and are limited in performance. Pillar shapes with straight sides and hierarchical, stacked pillar shapes with straight sides, buckle under high loads. Buckling, bending and collapse of these structures limit the maximum shear force and grip that can be obtained.

Traditionally, uniform arrays of micro features, micro pillars, or micro holes wherein the arrangement of features within the arrays may be rectangular, triangular or random have been used. Medical device stents are described with spiral strips of micro patterns made from continuous arrays or with flare ends or center portions of the stents wrapped with continuous arrays of micro patterns. However, clusters of micro pillars with $$\frac{\text{land}}{\text{sea}}$$

ratio optimized tor mid evacuation and pressure concentration to maximize grip and lateral shear force have not been previously described.

SUMMARY OF THE INVENTION

The above objectives are accomplished according to the present invention by providing a gripping surface for manufactured articles comprising: a first pillar, having a first apex vector and disposed on the manufactured article; a first draft angle defined by a first side of the first pillar and a surface of a substrate; a second draft angle defined by a second side of the first pillar; a second pillar having a second apex vector wherein the first apex vector and the second apex vector are configured to converge; a first cluster defined by the first pillar and the second pillar; a second cluster wherein a cluster distance between the first cluster and the second cluster is greater than a distance between the first pillar and the second pillar and, a cluster footprint defined by the first cluster and the second cluster wherein the cluster footprint and an area occupied by the cluster footprint is 80% or less relative to a substrate area.

A contact surface can be defined by an aggregate of the tops of each pillar wherein the contact surface that is less than 25% of a substrate surface. The contact surface can be defined by an aggregate of the tops of each pillar wherein the contact surface that is less than 10% of a substrate surface. A void can be defined by a plurality of clusters wherein the void is less than 50% of a substrate surface. The void can surround a set of clusters. Two or more pillars can combine to provide a contact surface with a pull force greater than 50 newtons according to a pull test. The first pillar can be in a range of 15 µm to 300 µm in diameter. The first pillar can be 300 microns or less in height. A third pillar can have a third apex vector wherein the first apex vector, the second apex vector and the third apex vector define a triangular pillar array. The triangular pillar array can be an inner triangular pillar array; and an outer triangular pillar array can be defined by a set of outer pillars each having an outer draft angle wherein the outer draft angle is equal or larger than any one of the first draft angle, the second draft angle and a third draft angle.

The first cluster, the second cluster and a third triangular array can define a circular footprint. A set of clusters can be disposed on the substrate define a cluster footprint, and a ratio of the cluster footprint is in a range of 25% to 85% relative to a substrate area. The second pillar can have a second apex vector wherein the first apex vector and the second apex vector are parallel. The combination of pillars can be configured to have a higher grip force in a first direction and a lower grip force in a second direction. A first cluster can be defined by the first pillar and the second pillar and having a first cluster slant angle; a pillar distance defined between the first pillar and the second pillar; a second cluster disposed at a distance from the first cluster greater than the pillar distance; and a second cluster slant angle parallel to the first cluster slant angle.

A first cluster can be defined by the first pillar and the second pillar and having a first cluster slant angle; a pillar distance defined between the first pillar and the second pillar; a second cluster disposed at a distance from the first cluster greater than the pillar distance and having a second slant angle, and, wherein the first cluster slant angle and a second cluster slant angle sum to about 180 degrees. An opening can extend through the manufactured article.

The first pillar can be disposed at an edge of the manufactured article and has a first pillar height; the second pillar is disposed on an interior of the manufactured article and includes a second pillar height; and, wherein the first pillar height is less than the second pillar height.

The gripping surface can include a first pillar cluster disposed on a substate carried by the manufactured article and having: a first pillar, having a first apex vector and a first draft angle defined by a first side of the first pillar and a substrate; a second draft angle defined by a second side of the first pillar and the substrate wherein the second draft angle is less than the first draft angle; and, a second pillar having a second apex vector wherein the first apex vector and the second apex vector are parallel; wherein the first pillar cluster has a triangular orientation; and, a second pillar cluster having: a first set of pillars arranged in a first concentric circle; and, a second set of pillars arranged in a second concentric circle wherein the first pillar cluster and the second pillar cluster cover less than 25% of the article.

The surface can include a first pillar having a height of 300 µm or less relative to the substrate and a land to sea ration of 1:3 or less.

The voids can be greater than 50% of the substrate surface. The first pillar can be first pillar is 30 µm or more in height. The different pillar heights cooperate to reduce the maximum peak pressure of a cluster contacting a second substrate compared to a cluster with uniform pillar heights. The triangular pillar array can be a first triangular pillar array; and a second triangular array wherein the first triangle pillar array and the second triangular pillar array define a triangular cluster having a triangular footprint.

A first set of clusters can have a first cluster slant angle and a second set of clusters having a second cluster slant angle wherein the first cluster slant angle and the second cluster slant angle are not equal.

The opening in the substrate can include a diameter in the range of 30 microns to 475 microns.

The manufactured article can be a film or medical device. The film can be placed on the medical device.

The first pillar can have a cross section taken at a base in the range of 100 µm2 to 160,000 µm, a height relative to the substrate in the range of 10 µm to 400 µm and a top pillar disposed on a top of the first pillar.

The substrate and pillars can be made by 3D printing, ink printing, laser machining, micro-CNC machining, lithography, electrical discharge machining, electrochemical machining, sputter deposition processes, deforming thin films and foils, plasma treatment, stamping or combination of those processes. The materials of the substrate and pillars can be polymers and metals. The size of the clusters can be non-continuous, or the void can be continuous. The spacing between pillars can be in the range of 5 µm to 500 µm and the spacing between clusters can be in a range of 50 to 5000 µm. The height of the pillars in a cluster can be different and configured to improve the uniformity of contact pressure across the cluster. The pillar shapes can be round, square, rectangular, hollow, stars, geometric shapes, pillars and any combination.

The combination of the pillars and substrate can be configured to increases the forces of tensile adhesion, peel adhesion and anchoring between two substrate surfaces where one substrate surface can have uniform or clustered arrays of pillars can be achieved by creating a radial or lateral shear force on the pillars engaging and penetrating the opposing substrate surface. The lateral shear force on the pillars may be created by stretching, compressing, rotating, twisting, wrinkling, swelling, shrinking, thermally expanding, or deforming one of the two opposing substrate surfaces prior to bringing together and engaging the surfaces, then bring together and engaging the surfaces using a load applying normal force, and then releasing the lateral shear force. The pillar shape may be a straight single pillar, a pillar with symmetric or asymmetric draft angles, and a surface with stacked or hierarchical pillar arrangements.

DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

ratio is defined

Figure 5:
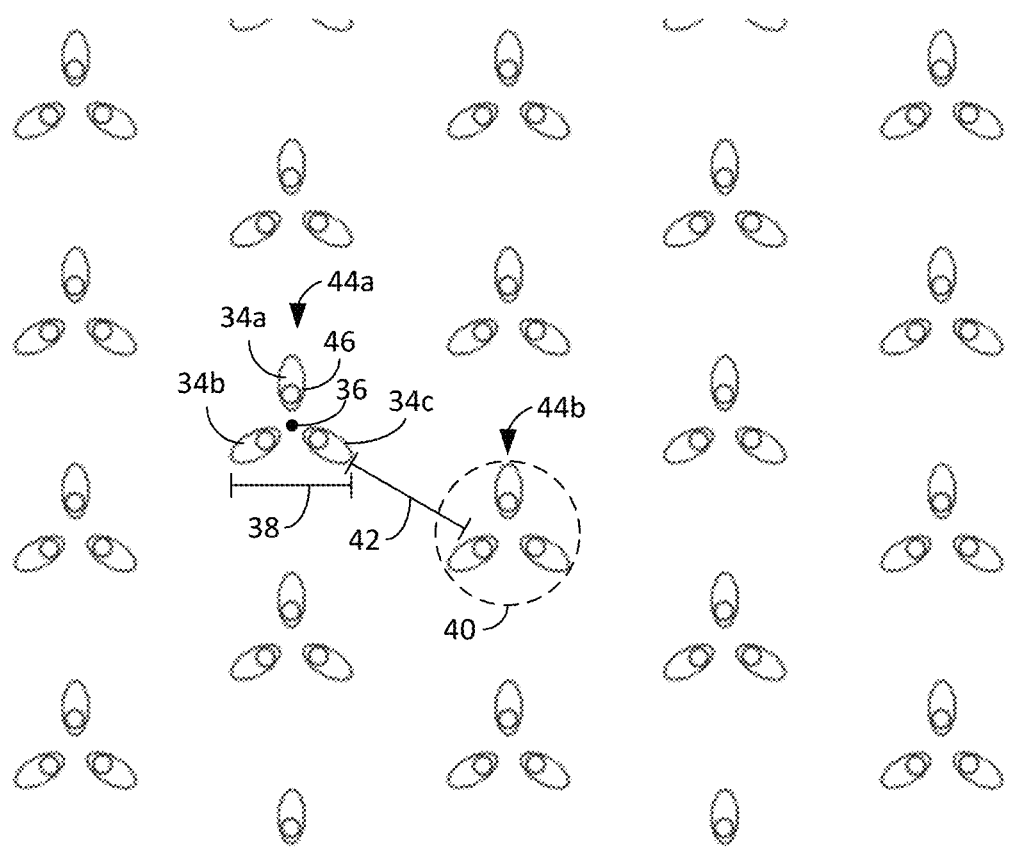

FIG. 5 shows an example of triangular clusters with 3 pillars each.

Figure 6:
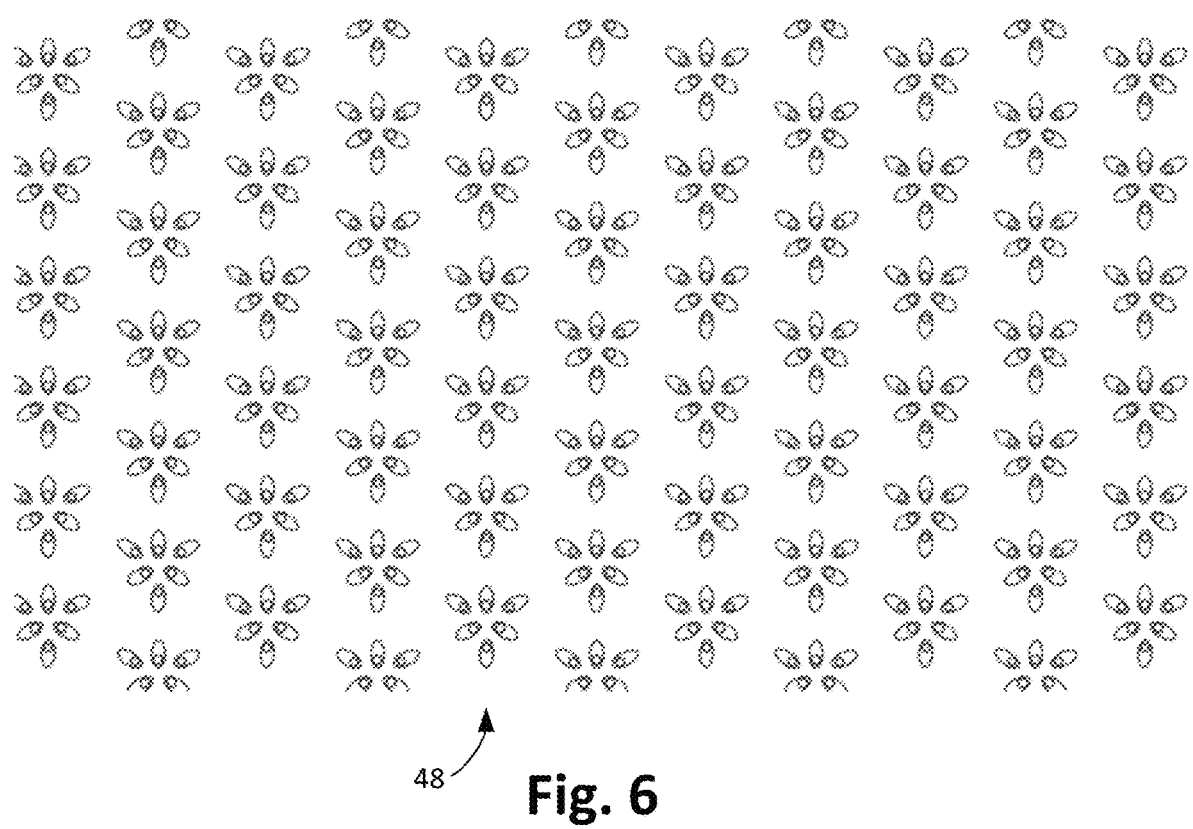

FIG. 6 shows an example of triangular clusters with 6 pillars each.

Figure 7:
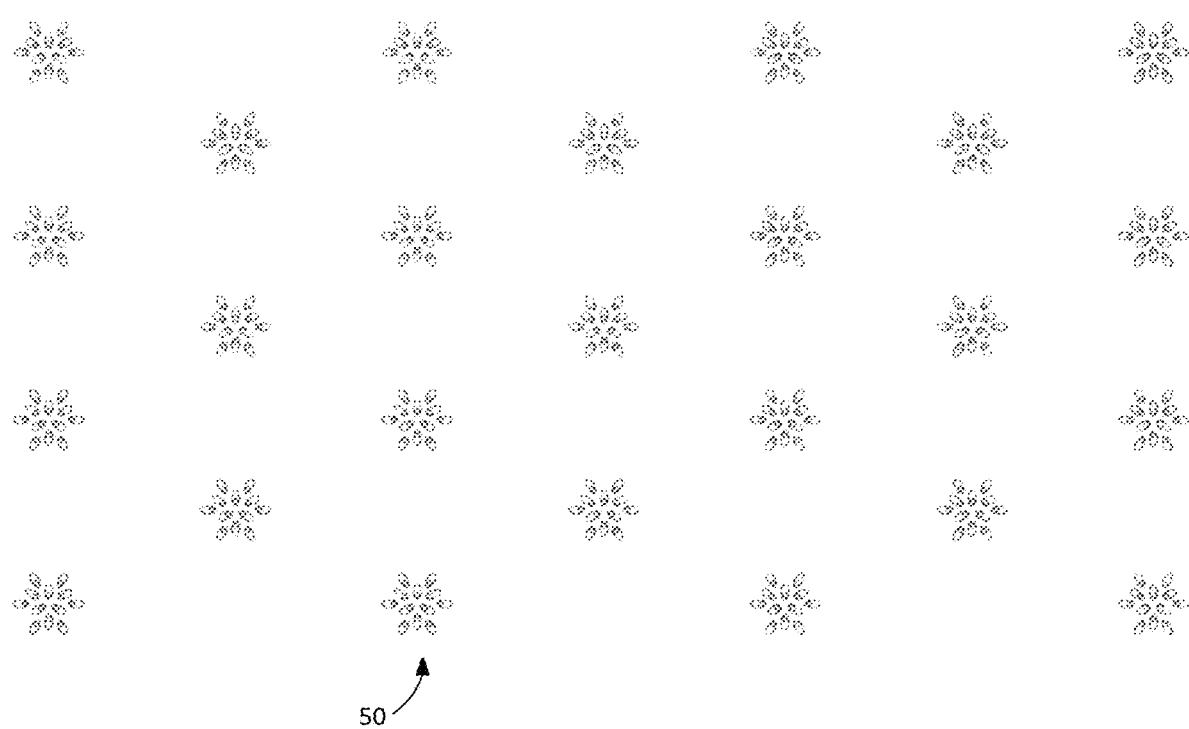

FIG. 7 shows an example of triangular clusters with 12 pillars each.

Figure 8:
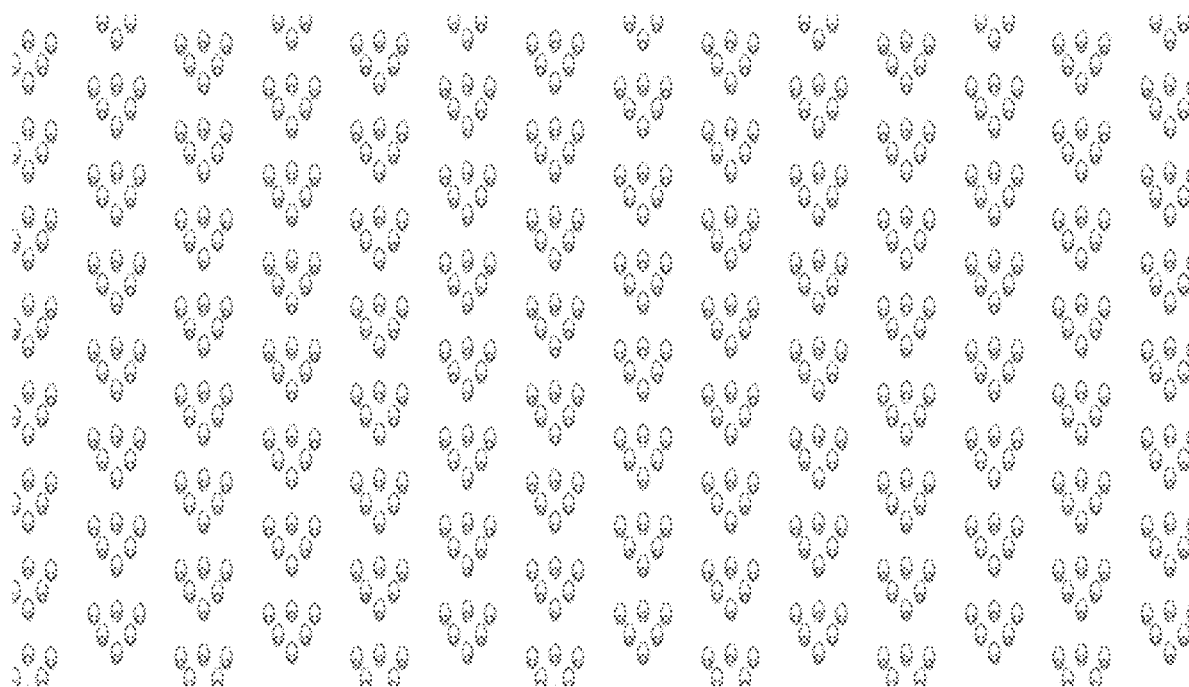

FIG. 8 shows an example of triangular clusters with 6 pillars.

Figure 9:
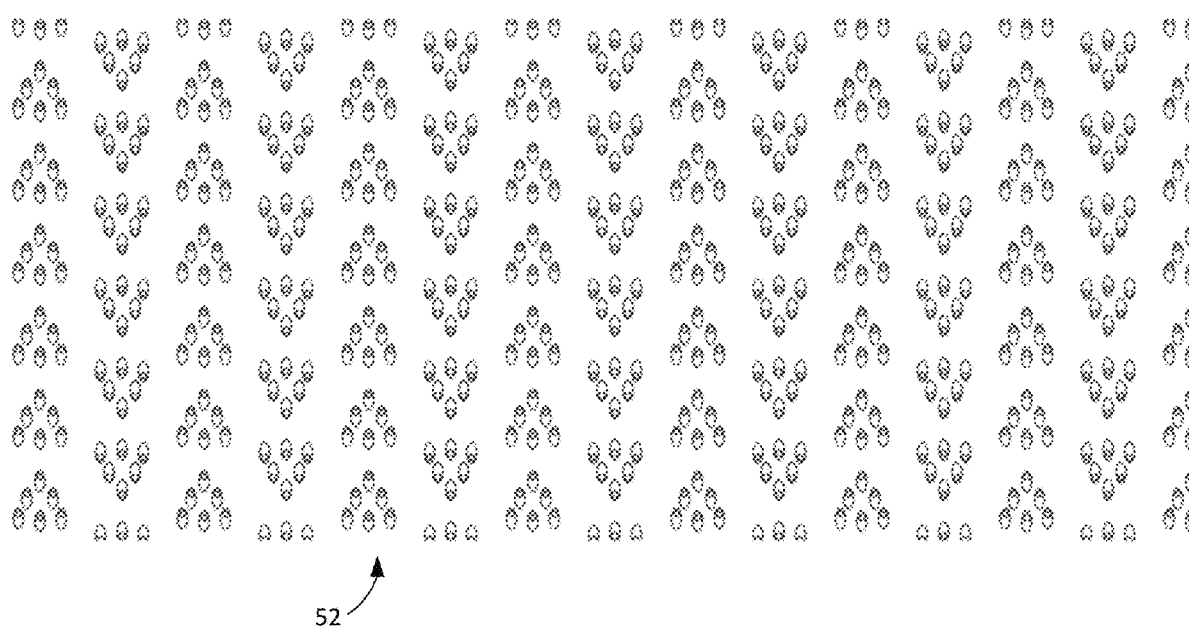

FIG. 9 shows an example of triangular clusters with 6 pillars each.

Figure 10:
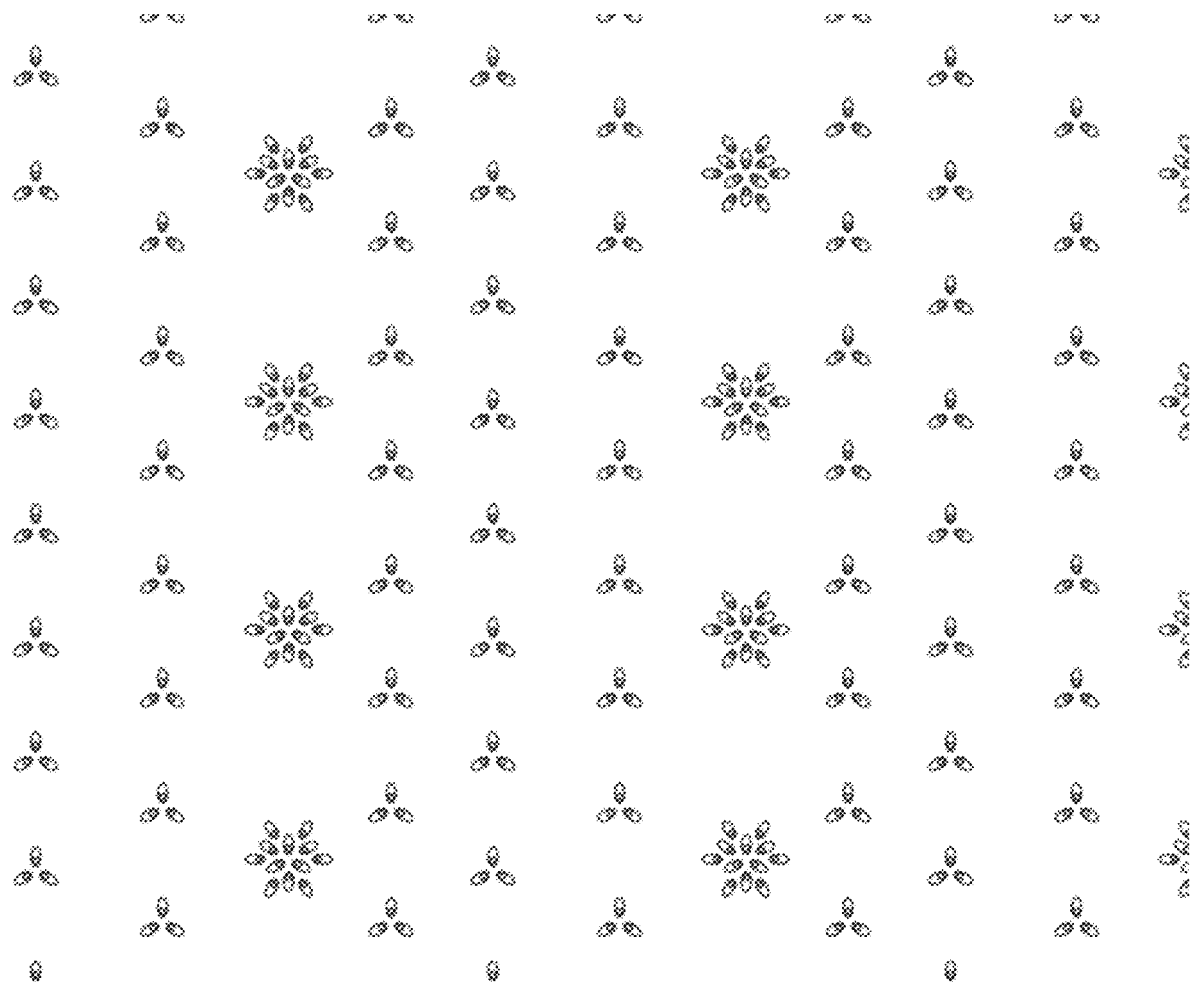

FIG. 10 shows an example of triangular clusters with 3 pillars or 12 pillars each.

Figure 11:
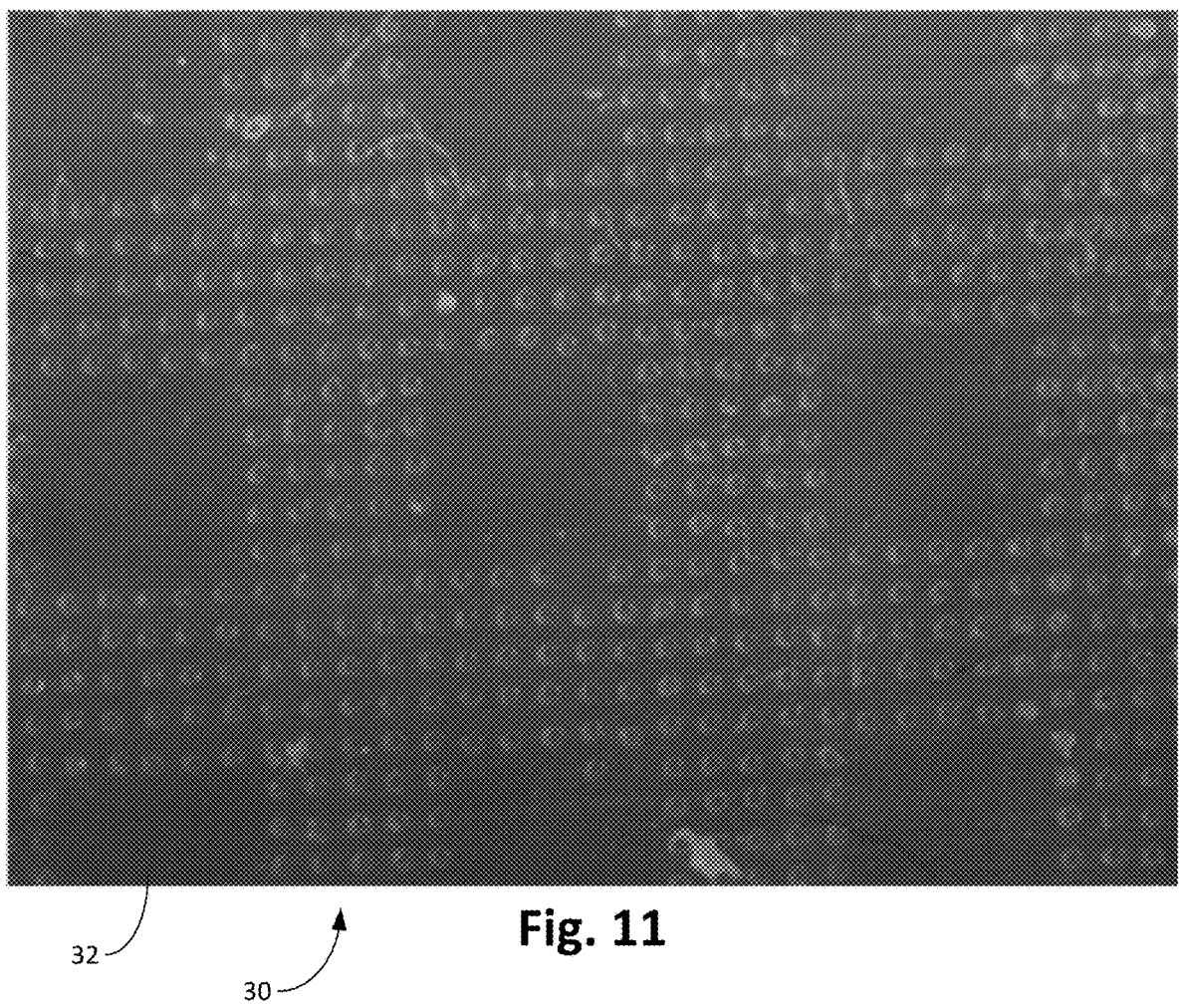

FIG. 11 shows an example of cross stripe clusters.

Figure 12:
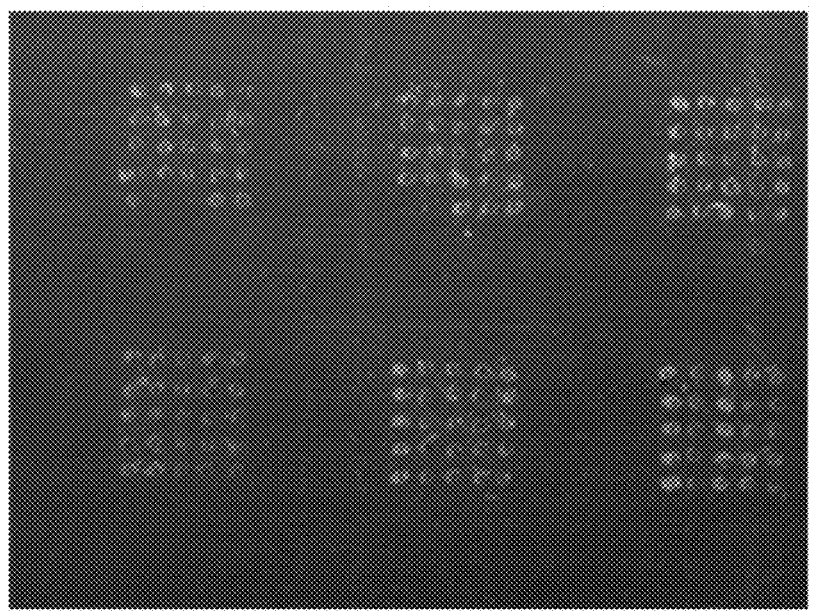

FIG. 12 shows an example of square clusters.

Figure 13A:
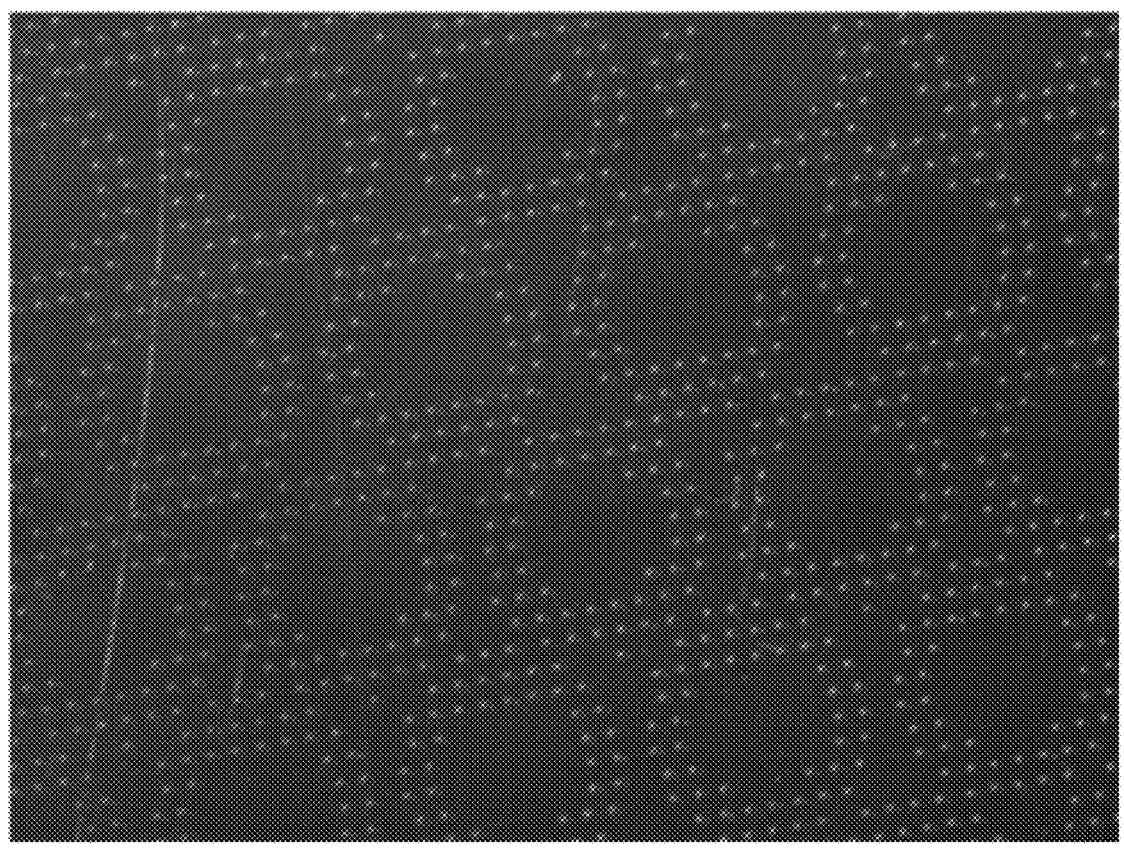
Figure 13B:
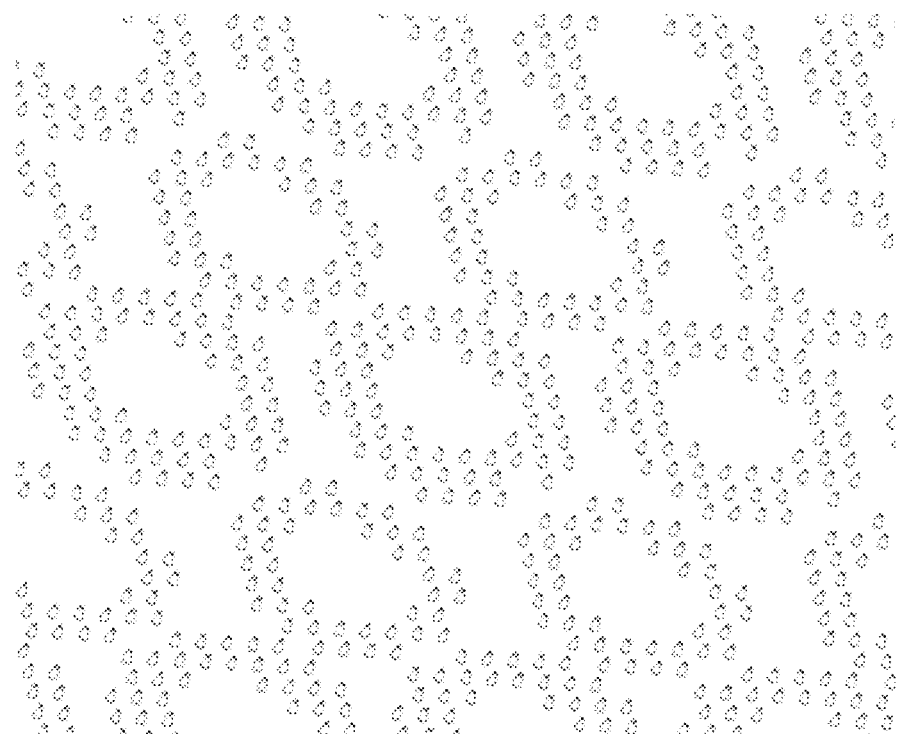
Figure 13C:
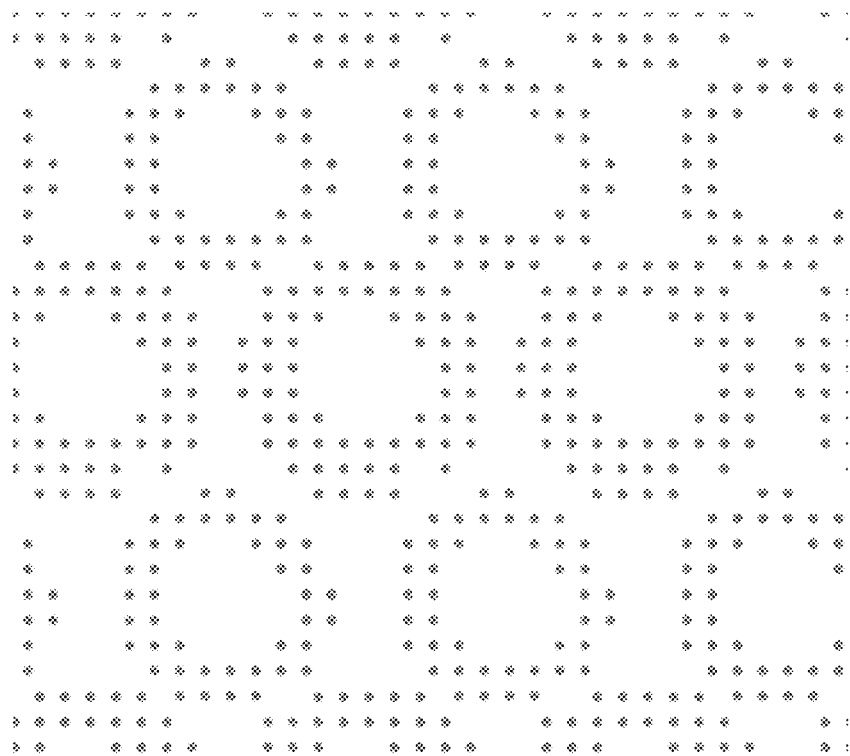
Figure 14A:
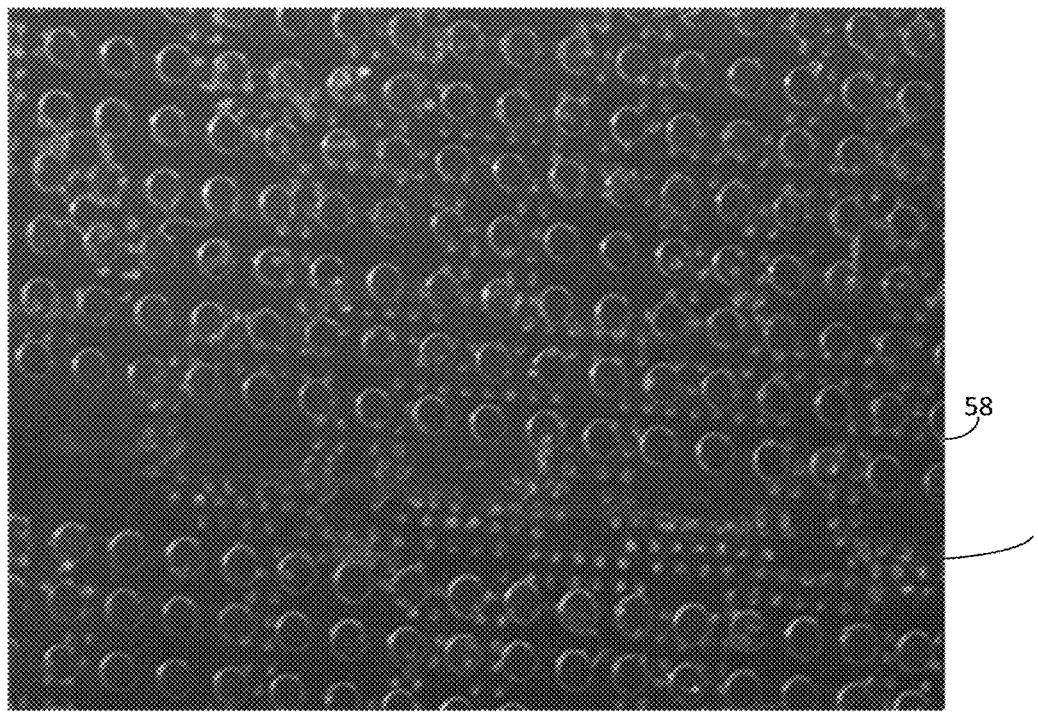
Figure 14B:
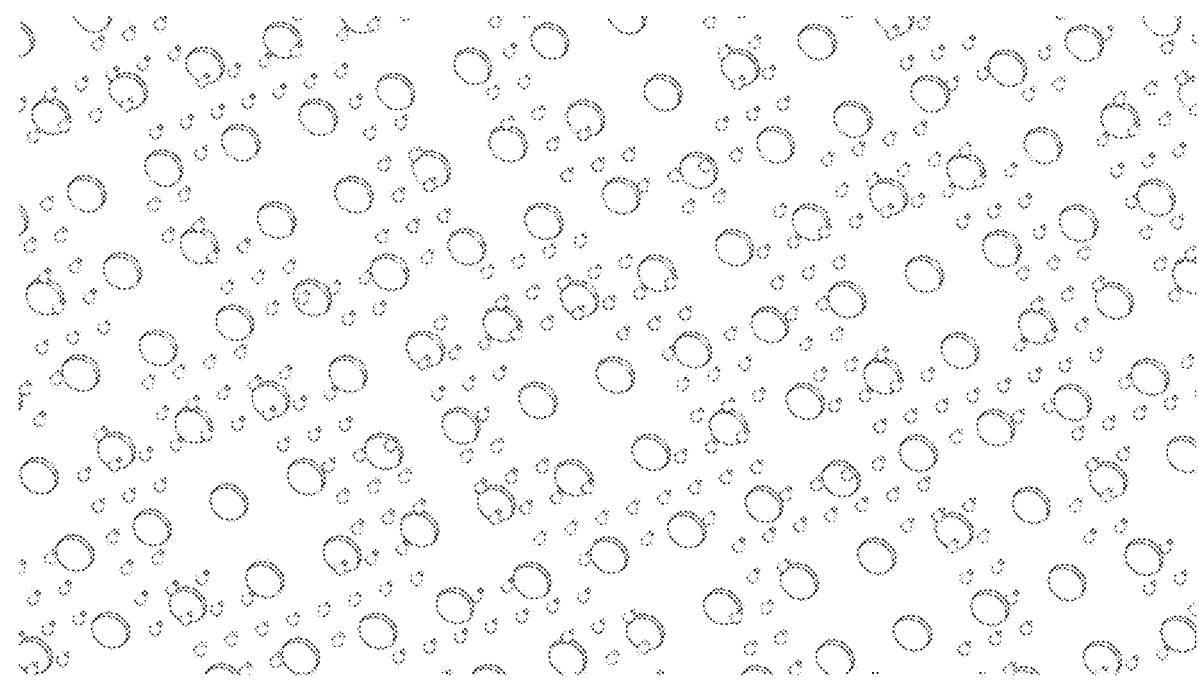
Figure 14C:
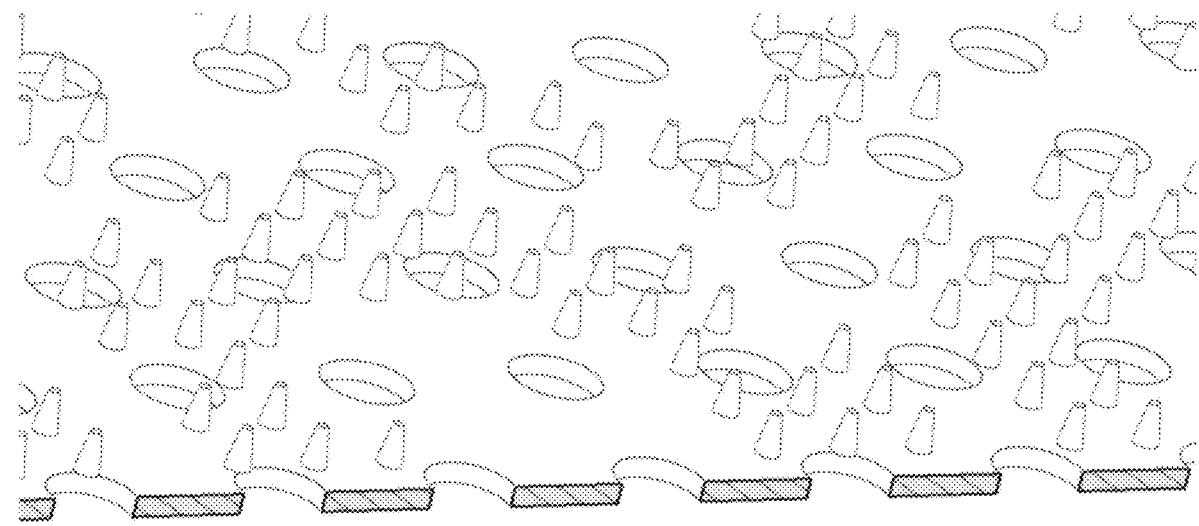
Figure 14D:
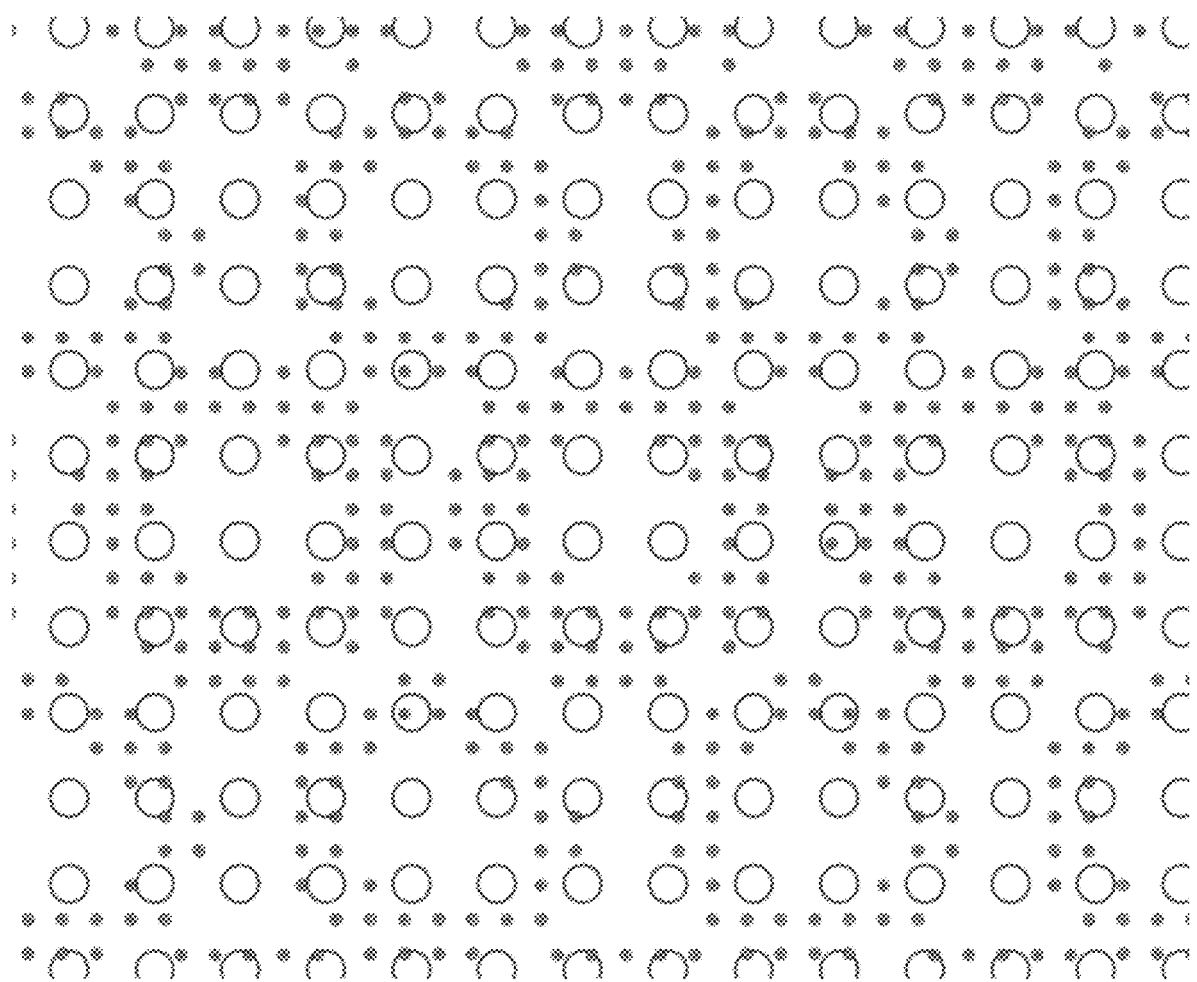

FIG. 13A through 13C show examples 1 of ring clusters.

FIG. 14A through 14D show examples of ring clusters with through holes.

Figure 15:
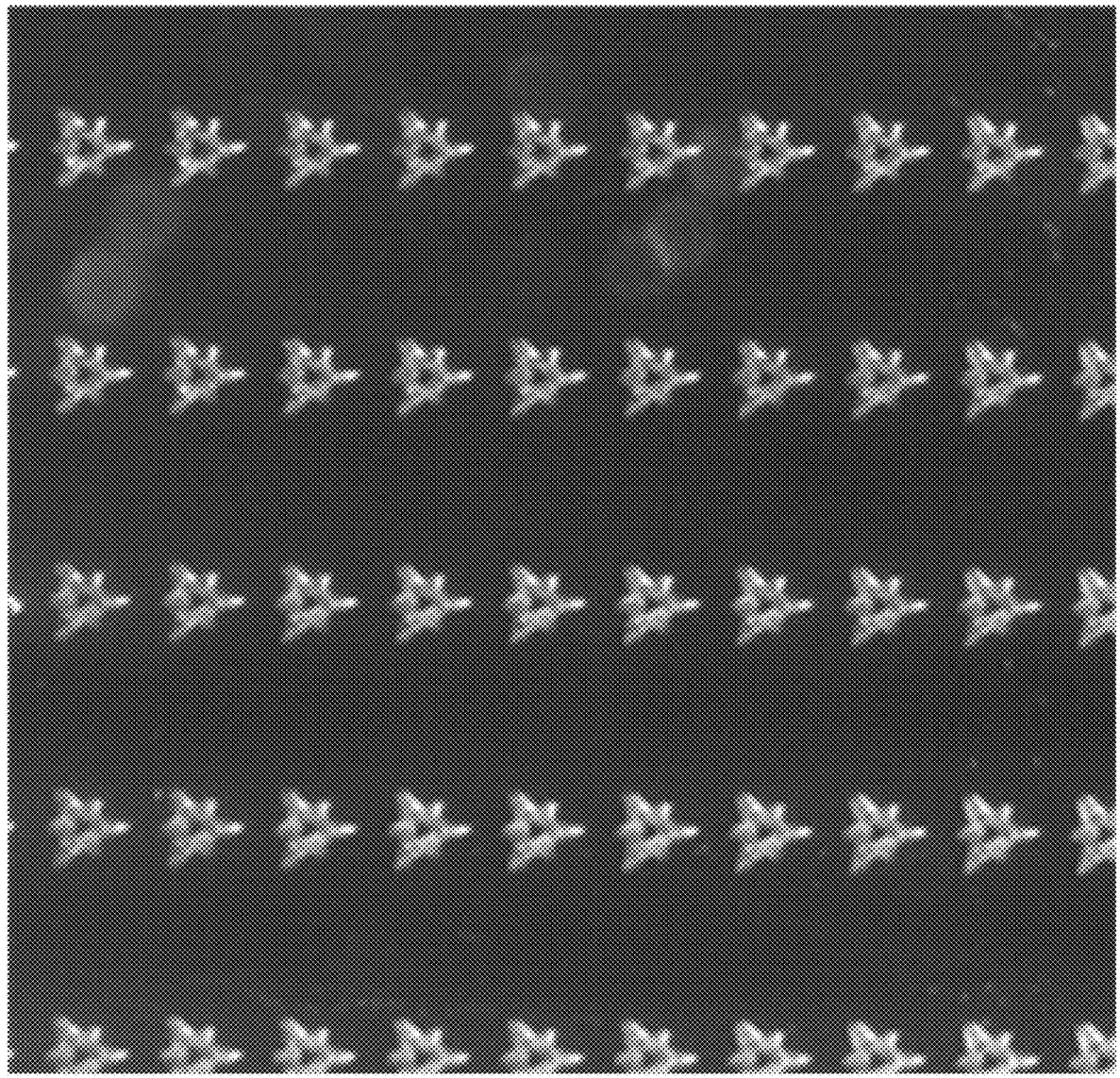

FIG. 15 shows an example of triangular clusters of 6 asymmetric pillars.

Figure 16:
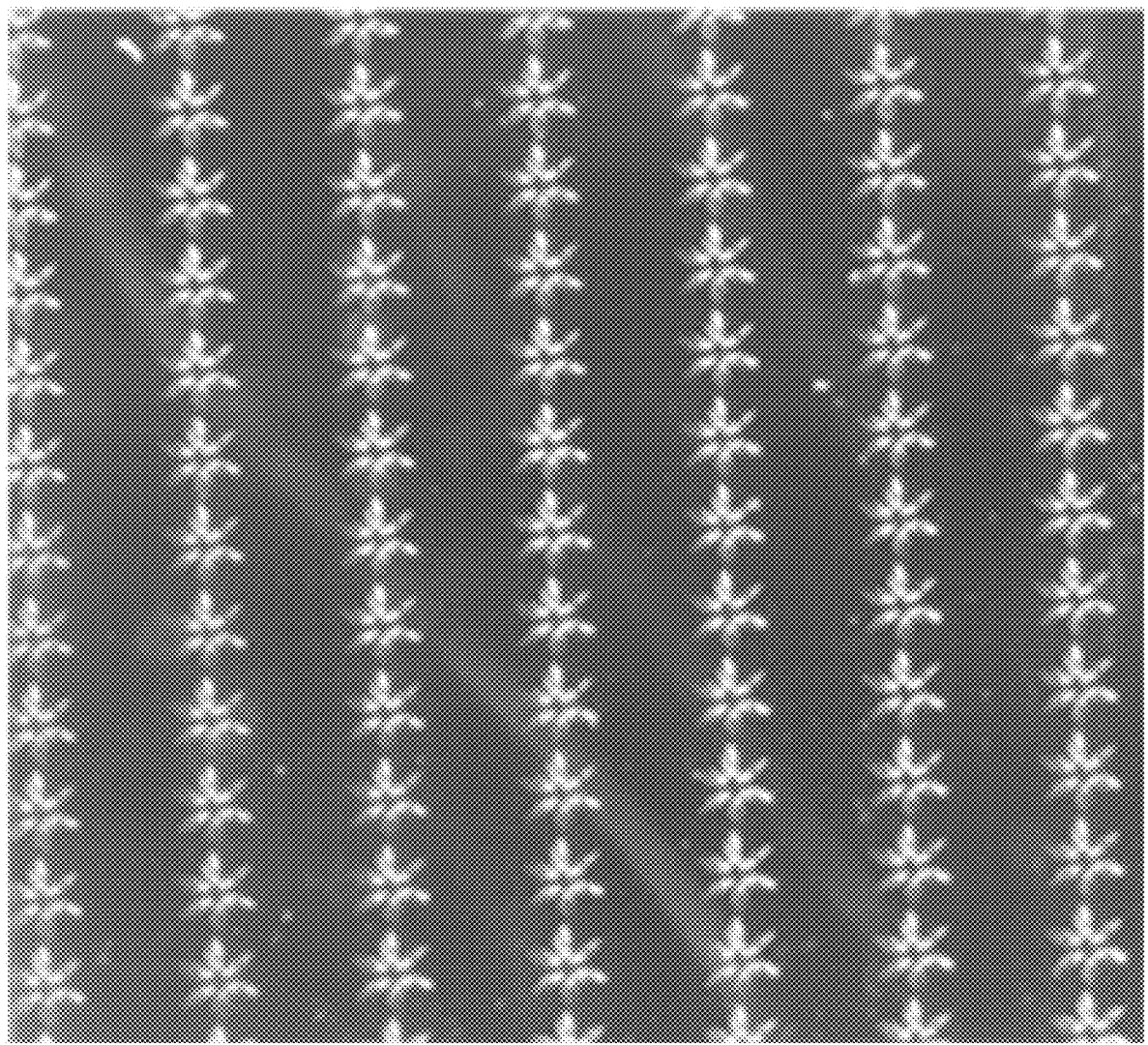

FIG. 16 shows an example of circular clusters of 6 asymmetric pillars.

Figure 17:
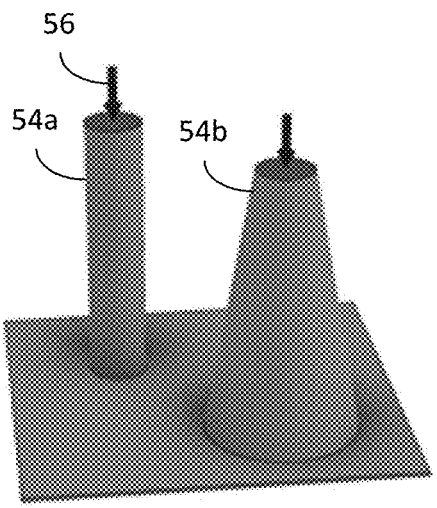

FIG. 17 is an image of pillars showing surface and direction of applied force.

Figure 18:
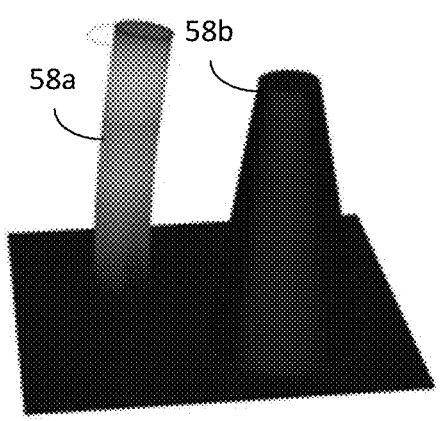

FIG. 18 is an image of pillars in finite element simulation showing occurrence of buckling.

Figure 19:
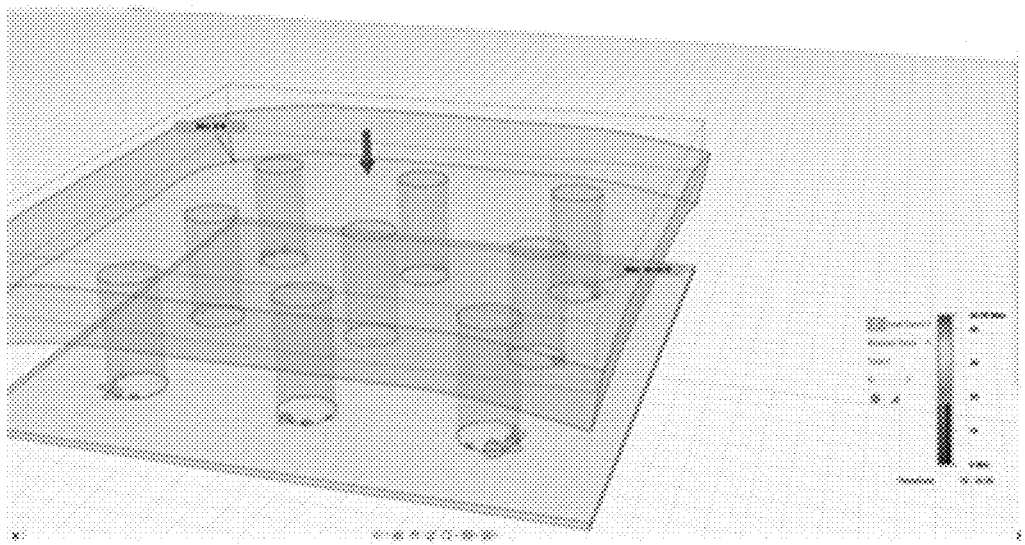

FIG. 19 is an image of pillars in cluster of uniform height in finite element simulation showing areas of maximum pressure.

Figure 20:
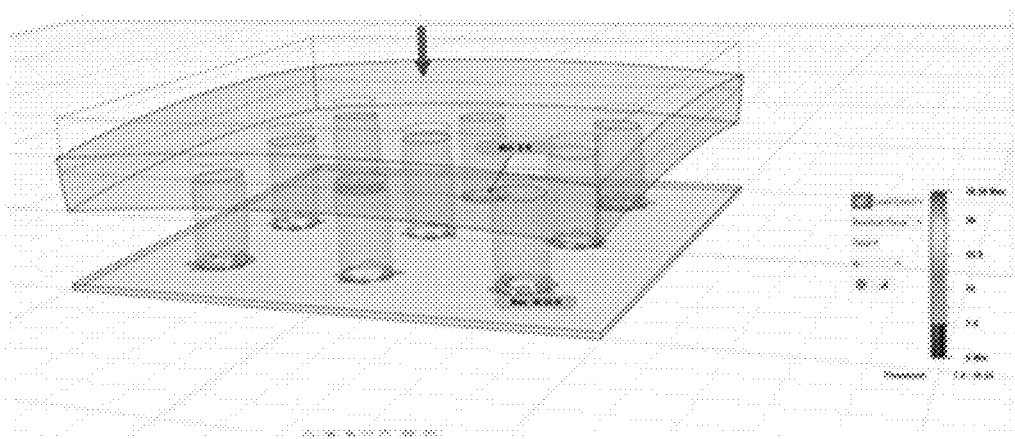

FIG. 20 is an image of pillars in cluster of optimized height in finite element simulation showing areas of maximum pressure.

DESCRIPTION

This invention relates to clusters of individual micro pillars where the difference in spacing between features within a cluster is less than the spacing between clusters of micro pillars and where the closest spacing between the micro features in a cluster is less than height of a pillar and the height of a pillar is in the range of 10 to 400 um, and, where the clusters of micro features enhance grip of thin polymer film to dry, wet or other slippery substrates. The void area without micro pillars between clusters provides for evacuation of fluid from the clusters permitting greater contact pressure of the micro pillars within a cluster. These novel arrangements of clusters of micro pillars give greater grip than uniform arrays of micro pillars. This result is particularly important when viscosity of the fluid increases and when height of the micro pillars decreases as required for small medical device. This effect is analogous to use of a tread design on a tire to evacuate fluid to enhance grip.

The pillars and clusters of pillars can be referred to as "land" and the areas or voids without micro pillars can be referred to as the "sea". The area of the land is the cluster footprint area relative to the substrate area. The cluster footprint area is the sum of the areas of the top surface of the pillars in a cluster. The land to total area ratio defines the area covered with micro features to that covered with void. This land/total area ratio can be adjusted to improve wet traction and can improve grip to wet biological tissue. The void areas can be less than 5 mm wide and preferably can be less than 2 mm wide. The land to total area ratio can be in the range from 25% to 85% and with the micro contact area, averaged over the total area less than 15% and preferably in the 0.25% to 5% range.

The structure described herein can also improving grip of thin films covered with micro pillars by including opening or holes (including micro holes) through the thickness of the film or substrate to allow flow of the fluid though the film. For films less than 200 µm thick the micro holes can be between 50 and 500 µm in diameter and cover 25% to 60% of the total area.

Clusters of micro pillars can be included where the difference in height between pillars within a cluster is less than one-half the largest height of a micro pillar within a cluster and where the closest spacing between the micro pillars in a cluster is less than height of a pillar and the height of a pillar is in the range of 10 µm to 400 µm, and, where the clusters of micro features enhance grip of thin polymer film to dry, wet or other slippery substrates. In one embodiment pillars are 300 µm in relative height relative to the substrate surface.

The clusters can include symmetric draft angle micro pillars or asymmetric draft angle micro pillars where the difference in draft angle from one side of the pillar to another side is at least 10 degrees and where the closest spacing between the micro pillars in a cluster is less than height of a pillar and the height of a pillar is in the range of 10 µm to 400 µm, and, where of the clusters of asymmetric draft angle micro features enhance grip of thin polymer film to dry, wet or other slippery substrates. The invention can provide for a high grip film product with the ability to grip one side or both sides of a substrate.

The structure described herein may serve as a cover on the surface of medical devices such as self-expanding stents, polymer tube type stents, electrical device leads, implanted films, condoms, medical gloves, implanted electronic components, hernia meshes, barrier films, plastic surgery implants, breast implants, medical balloons, cardiac assist devices, cardiac repair devices, vascular catheters and delivery devices, birth control devices, implanted RFID tags, implanted sensors, lead wire covers, implanted electronics and similar devices. It may also be used in non-medical applications such as for packaging, labels, gloves, apparel, shoe closures, roofing, construction films, drop cloth fabrics and films, anti-slip walking or tub and shower surfaces, surf boards, skateboards, handle wraps, handle grips, motorcycle foot pegs, grips and seat covers, recreational goods and the like.

The high grip surfaces and articles using those surfaces may be made by rapid prototyping, 3D printing, ink printing, laser machining, CNC machining (including micro-CNC), lithography, electrical discharge machining, electrochemical machining, sputter deposition processes, deforming thin films and foils, rolling, extruding, molding, thermal deforming, stamping or any combination of those processes.

The process to make the invention herein can take advantages of improvement in 3D printing to sub-micron precision in 3D printing software and computing power allowing for manufacturing of larger range of micro and nano scale shapes. As the understanding and characterization of mechanical properties of most tissues, organs and structures in the body advances and the improved computational power, this invention can be designed with simulation techniques to predict contact areas, deformations and pressures, fluid flows and other properties necessary to simulate and predict grip, friction and migration in this complex environment.

Further, the medical industry has a variety of devices and implants which require grip. These devices may need to grip skin or other human tissue inside the body in dry, wet, or slippery conditions. Currently, there is much research being carried out to prevent migration of implants inside the body or to prevent relative motion between two organs or to just provide a barrier to help healing of tissue. These are just a few examples but the need for grip is vital under lubricated conditions. These devices are generally inserted through small introducer tubes and thus need to be collapsible to a small volume.

It is accordingly an object of the invention to provide a novel and improved high grip micro surface consisting of non-hierarchical micro features where the micro features are arranged in clusters of 5 to 500 micropillars and where the difference in spacing between features within a cluster is less than one-third the largest spacing between adjacent clusters of micro features and where the closest spacing between the micro features in a cluster is less than height of a pillar and the height of a pillar is in the range of 10 to 400 um, and, where the micro contact area, averaged over the cluster repeat unit area, is less than 25%, and, where the clusters of micro features enhance grip of thin polymer film to dry, wet or other slippery substrates. The cluster repeat unit area includes the cluster footprint area and the area of void without pillars that occur in a repeating manner across an entire array of a micro pattern.

Within a cluster, the micro features may be arranged in arrays that are uniform rectangular, triangular, random, or varying in a periodicity that may be uniform and isotropic, uniform and aligned, random and aligned and the periodicity may be concave, convex, V-saddle, H-saddle all of which may include randomness in the array spacing or other continuous array arrangements. In addition, the micro feature arrays may include continuous rib features in various arrangements such as crosshatch, diamond, sinusoidal, weave, snow flake, Koch snowflake, Sierpinski gasket, Apollonian gasket, diffusion limited aggregation pattern, rings, donuts, symbol shapes, geometric figures, and combinations of these patterns. In addition, the micro pattern arrays may cover three dimensional shapes that may be pyramidal, sinusoidal, bumped, bulged, hills and valleys, wavy, fractal-like, pseudo-fractal, multiple texture scales, Schallamach waves or other geometric shapes. The micro features of an array within a cluster, may be single pillars, multi-layer stacked pillars, or hierarchical pillars and may have various cross-section shapes including round, square, star, spikes, irregular polygon, rings, donuts, symbol shapes, geometric figures, and combinations of these patterns.

The clusters may be arranged in various patterned area of land, containing the micro features, and sea which are void areas without micro features. The land and sea clusters may be arranged in patterns of an infinite variety of shapes including cluster arrays that are uniform rectangular, triangular, random, or varying in a periodicity that may be uniform and isotropic, uniform and aligned, random and aligned and the periodicity may be concave, convex, V-saddle, H-saddle all of which may include randomness in the cluster array spacing or other continuous cluster array arrangements. In addition, the cluster arrays may include continuous or discontinuous features in various arrangements such as crosshatch, diamond, sinusoidal, weave, snowflake, Koch snowflake, Sierpinski gasket, Apollonian gasket, diffusion limited aggregation pattern, rings, donuts, symbol shapes, geometric figures, and combinations of these patterns. In addition, the micro pattern arrays may cover three dimensional shapes that may be pyramidal, sinusoidal, bumped, bulged, hills and valleys, wavy, fractal-like, pseudo-fractal, multiple texture scales, Schallamach waves or other geometric shapes.

This invention also relates to clusters of micro features where the difference in height between features within a cluster is less than one-half the largest height of a micro feature within a cluster and where the closest spacing between the micro features in a cluster is less than height of a pillar and the height of a pillar is in the range of 10 to 400 um, where the micro contact area, averaged over the cluster repeat unit area, is less than 25% and, where the clusters of micro features enhance grip of thin polymer film to dry, wet or other slippery substrates. The height of the micro features within a cluster may be optimized with finite element analysis and other computational methods to minimize peaks of pressure occurring within a material while maximizing the overall lateral force and grip that can be achieved.

This invention also relates to clusters of asymmetric draft angle micro features where the difference in draft angle from one side of the pillar to another side is at least 10 degrees and where the closest spacing between the micro features in a cluster is less than height of a pillar and the height of a pillar is in the range of 10 $\mu$m to 400 $\mu$m, where the micro contact area, averaged over the cluster repeat unit area, is less than 25%, and, where of the clusters of asymmetric draft angle micro features enhance grip of thin polymer film to dry, wet or other slippery substrates. The draft angle on one side of the asymmetric pillar may be negative which can enhance both lateral and adhesive forces.

This invention also relates to use of micro holes through the thickness of the film to allow flow of the fluid though the film. The micro holes may be arranged in patterns of an infinite variety of shapes including cluster arrays that are uniform rectangular, triangular, random, or varying in a periodicity that may be uniform and isotropic, uniform and aligned, random and aligned and the periodicity may be concave, convex, V-saddle, H-saddle all of which may include randomness in the cluster array spacing or other continuous cluster array arrangements. In addition, the cluster arrays may include continuous or discontinuous features in various arrangements such as crosshatch, diamond, sinusoidal, weave, snow flake, Koch snowflake, Sierpinski gasket, Apollonian gasket, diffusion limited aggregation pattern, rings, donuts, symbol shapes, geometric figures, and combinations of these patterns. In addition, the micro pattern arrays may cover three dimensional shapes that may be pyramidal, sinusoidal, bumped, bulged, hills and valleys, wavy, fractal-like, pseudo-fractal, multiple texture scales, or other geometric shapes. The walls of the holes may be straight, tapered with draft angles or venturi shaped, or have radial fins. The shape of holes may be round, square, triangular, symbol shapes, geometric figures, and combinations of these patterns For films less than 200 $\mu$m thick the micro holes give optimum performance between 50 $\mu$m and 490 $\mu$m in diameter and cover 25% to 60% of the projected area of the film.

The materials comprising the micro features, or the clusters of micro features may be polymers, materials, or ceramics. The materials may change shape when exposed to water, solvents, heat, electrical or magnetic energy. Metals include steel, nickel, copper, titanium, tungsten and other metals commonly used in medical devices and industrial applications. Polymers include plastics, elastomers, rubbers, biological materials, resorbable materials, thermoplastics, thermosets, coatings, food stuffs, textiles, wovens, non-wovens, monofilaments, multi-filaments and the like. Ceramics include glasses, alumina, bauxite, carbides, nitrides, synthetic diamond, sapphire and the like.

Biological tissues often have an anisotropic structure such as the orientation of muscle fibers. Required grip and friction forces within the body are also often anisotropic. For example, a stent may need to expand or contract in a circumferential direction without sliding or migrating in a lateral direction. As a structure in the body grows or changes shape over time, it may be useful to have a device move in one direction but not in others.

It has been unexpectedly found that clusters of arrays of micro pillars provide higher grip than uniform arrays of individual micro pillars. We find that under a grip force the pillars in clusters self-support each other to better distribute load over the biological tissue such as a fingerprint, skin and muscular structure. Spacing between clusters helps evacuate fluids from the surface and structures.

Draft angle is the angle relative to vertical of the side of a pillar or shape. A positive draft angle is outward so that the base of the pillar is wider than the outer end. Conversely, a negative draft angle is inward so that the base of the pillar is narrower than the outer end. This term is commonly used in the rubber and plastic molding and mold making industry.

Clusters of asymmetric or symmetric draft angle micro features can have higher resistance to buckling than an array of straight pillars of the same micro contact area. For example, a straight pillar with a height of 70 µm and a diameter of 15 µm has a height to width aspect ratio of about 4.67. This array of pillars, when made of a rubbery polymer, will bend under a small load while a pillar with the same height and tip diameter of 15 µm with a draft angle of 10 degrees has a base diameter of 40 µm and resists a much higher load to bend.

Higher resistance to bending provides for higher force development when engaging polymers or biological tissue and thus results in higher grip and friction forces. Furthermore, by aligning the direction of asymmetry of the micro pillars in a cluster higher grip forces may be achieved in one direction compared to another. The asymmetry of the micro pillars in a cluster may be aligned in one direction such as positive lateral; in two directions such as positive and negative lateral; over an arc of direction such as positive 0 degrees to 90 degrees lateral. Thus, different micro surface designs may be made to optimize grip and friction force for different medical device geometries and different anatomical structures.

The micro pillar clusters may be arranged in different arrays such as square lattice, triangular lattice or random lattice and the cluster shapes may be symmetric or asymmetric shapes such as circles, squares, triangles, stars, rings, interlocking rings, snowflake shapes, letter shapes and geometric figures that may have aesthetic visual appeal as well as functional performance to improve grip, lateral friction force and fluid evacuation. Arrays may have clusters containing different number of pillars and clusters containing multiple shapes of pillars. The pillars may transition from one shape at the base to another at the tip and may have an asymmetric cross-section shape. Shapes of the pillars can be round, oval, square, rectangular, triangular, star, plus sign, irregular, or various interlocking shapes. The height of the pillars in a cluster can be different and optimized to have bending moments at differing load conditions. In one embodiment a first pillar can engage the substrate and bend at low loads, a second (and potentially shorter) pillar can engage and bend at medium loads, and a third pillar can engage and bend at high loads. These examples can cooperate to provide higher friction forces than any one pillar or set of like pillars alone. The interlocking shapes may be used to maximize grip and force development when the shapes are compressed under load during engagement of an opposite interface. The symmetrical or asymmetric pillar shapes may be aligned relative to one another or aligned relative to a cluster shape.

The high grip micro surface may be applied to one or both sides of a thin film with thickness as small as 20 µm. The micro features on thin polymer film are fabricated such that the ratio of total microfeature height to initial base thickness of film is in the range of 1 to 3 where the initial film thickness is in the range of 20 to 100 µm.

The high grip micro surface may also be applied to objects made by molding, casting, dipping, spraying, printing, rolling and similar processes.

It is an object of the invention to provide a high grip surface which has more than 50N grip force measured by the friction method. This high grip is present in dry, wet or other slippery conditions. The friction method consists of making polypropylene coupons with the micro surface on each side, then attaching the coupons to a load cell force measurement apparatus and pulling the dry surface between the thumb and forefinger while measuring the maximum pull force that can be obtained.

Contact area, also called micro contact area, can be defined as the area at the tips of an array of pillars or cluster of pillars as a percentage of the area of the repeat unit of the substrate of the array of pillars or cluster of pillars. This definition is a proxy for the actual physical area of contact and the local pressure of contact which may be measured experimentally or calculated by structural modeling. The cluster footprint area can be calculated at the base of the cluster of pillars and represent the area encompassed by a perimeter defined on the outer edges of the base of the pillars in a cluster.

Another object is the requirement of wet grip for many medical applications which require grip inside the body. It is also vital that the gripping device is small and with the least volume possible in order to be introduced into the human body with minimal incision.

In another object of the invention is to emboss micro features on the surface of a 10 to 200 micron thick resorbable or non-resorbable polymer or metal film which is intended to provide grip inside the body for a specified duration.

It is an object of the invention to fabricate a micro surface film that can either be adhered or molded on to most curved surfaces and on the surface of various intricate three-dimensional shapes.

In another embodiment of the invention, increases of the forces of tensile adhesion, peel adhesion and anchoring between two substrate surfaces where one substrate surface has uniform or clustered arrays of pillars can be achieved by creating a radial or lateral shear force on the pillars engaging and penetrating the opposing substrate surface. The lateral shear force on the pillars may be created by stretching, compressing, rotating, twisting, wrinkling, swelling, shrinking, thermally expanding or deforming one of the two opposing substrate surfaces prior to bringing together and engaging the surfaces, then bring together and engaging the surfaces using a load applying normal force, and then releasing the lateral shear force. The pillar shape may be a straight single pillar, a pillar with symmetric or asymmetric draft angles, and a surface with stacked or hierarchical pillar arrangements.

A further object of the invention is to emboss micro features that have low co-efficient of friction against hard plastic and metal surfaces, such as the inner surface of introducer, catheter, or other medical device, thus facilitating the introduction of the device with the high grip film inside the body.

A further aspect of this invention is that the asymmetry of the draft angle of pillars in a cluster may be combined with asymmetry of creating a chemical or physical coating on the pillars of a cluster. In one aspect of this invention, the pillars may be formed in a multi-layer film where in a thin outer layer of the multi-layer film may be higher stiffness or Young's modulus than thicker internal layers of the film. When the asymmetric pillars are formed in such a film, an asymmetric higher stiffness crust forms on the outer surface of the pillar. This increases the resistance to buckling of the pillar. If the thin outer film material swells in the presence of water, then the asymmetric pillar will deform in shape when implanted. This deformation can be used to create hook-like anchoring shapes that improve grip in both shear and tensile directions.

A further aspect of this invention is that rib or ridge like features of a continuous or discontinuous nature may be interspersed within a cluster of pillars, joining or across clusters of pillars or solely within the void space between clusters of pillars. The rib features may be of equal height or taller or shorter than the pillars in a cluster. The function of the rib features is to further improve any of grip, friction force, fluid evacuation or visual aesthetics.

Line of sight spraying of metals such as aluminum, gold, silver or platinum may be used to create a high stiffness crust. If the inner film material swells in the presence of water, then the asymmetric pillar will deform in shape when implanted. This deformation can be used to create hook-like anchoring shapes that improve grip in both shear and tensile directions.

Increases of the forces of tensile adhesion, peel adhesion and anchoring between two substrate surfaces where one substrate surface has uniform or clustered arrays of pillars can be achieved by creating a radial or lateral shear force on the pillars engaging and penetrating into the opposing substrate surface. The lateral shear force on the pillars may be created by stretching, compressing, rotating, twisting, wrinkling, swelling, shrinking, thermally expanding or deforming one of the two opposing substrate surfaces prior to bringing together and engaging the surfaces, then bring together and engaging the surfaces using a load applying normal force, and then releasing the lateral shear force. The pillar shape may be a straight single pillar, a pillar with symmetric or asymmetric draft angles, and a surface with stacked or hierarchical pillar arrangements.

Surface active reagents such as silanes may be sprayed in a line-of-sight direction against the asymmetric pillars in a cluster to create asymmetries of surface tension. For example, the base polymer may be highly philic and then treated with a phobic silane such as a chlorine or fluorine terminate silane. These mixed phobic-philic surfaces, also known a frustrated surfaces, may be used to improve interaction with mixed fluids containing both aqueous and lipid materials.

The micro pillar clusters may be arranged in different arrays such as square lattice, triangular lattice or random lattice and the cluster shapes may be widely varied such as circles, squares, triangles, stars, rings, interlocking rings, snowflake shapes, letter shapes and geometric figures that may have aesthetic visual appeal as well as functional performance to improve grip, lateral friction force and fluid evacuation. Arrays may have clusters containing different number of pillars and clusters containing multiple shapes of pillars. The asymmetric pillars may transition from one shape at the base to another at the tip. Shapes of the pillars can be round, oval, square, rectangular, triangular, star, plus sign, irregular, or various interlocking shapes. The interlocking shapes may be used to maximize grip and force development when the shapes are compressed under load during engagement of an opposite interface.

The high grip surfaces and articles using those surfaces may be made by rapid prototyping, 3D printing, ink printing, laser machining, micro-CNC machining, lithography, electrical discharge machining, electrochemical machining, sputter deposition processes, deforming thin films and foils, rolling, extruding, molding, thermal deforming, stamping or any combination of those processes.

Figure 1:
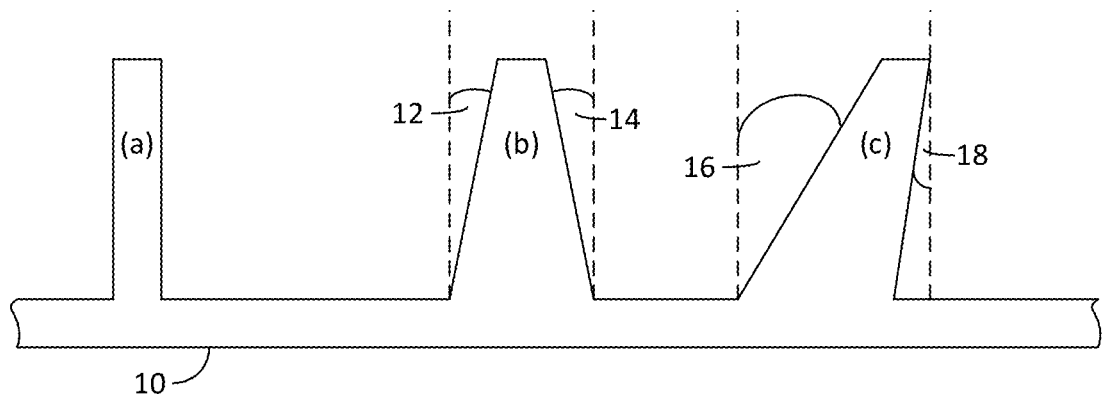
FIG. 1 is a drawing of the vertical cross section of pillars showing no draft angle, symmetric draft angle, and asymmetric draft angles.

Referring to FIG. 1, vertical cross sections of pillars (a), (b) and (c) with the same height and end diameter is shown. Pillar (a) has a zero-degree draft angle there by providing a pillar that is perpendicular or at about a right angle to the substrate 10. Pillar (b) has a draft angle 12 that is equal to draft angle 14 so that the draft angles are symmetrical. Pillar (c) has a first draft angle 16 that is larger than a second draft angle 18 so that the draft angles are asymmetrical. In one embodiment, the first draft angle is in the range of 20 degrees to 31 degrees and the second draft angle is in the range of −9 degrees to 5 degrees.

Figure 2:
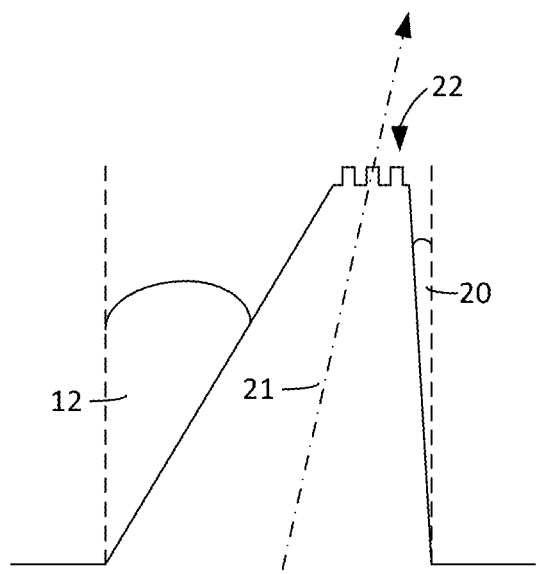
FIG. 2 shows one embodiment of draft angles.

Referring to FIG. 2, a draft angle can be defined between a perpendicular line to the substrate and a side of the pillar. The draft angle can be a positive number in this example. The draft angle can also be defined between a vertical line to the substrate and a side of the pillar so that angle 18 can be a negative number and the vertex of the draft angle at the top of the pillar. The draft angle 20 can be defined by a perpendicular line to the substrate and a side of the pillar with the vertex at the base of the pillar to define an angle having a positive number. In one embodiment, a set of pillars 22 can be disposed on the top of one or more pillars. This arrangement can create a hierarchy of pillars with the second set of pillars being smaller in dimension that the first set of pillars.

Figure 3:
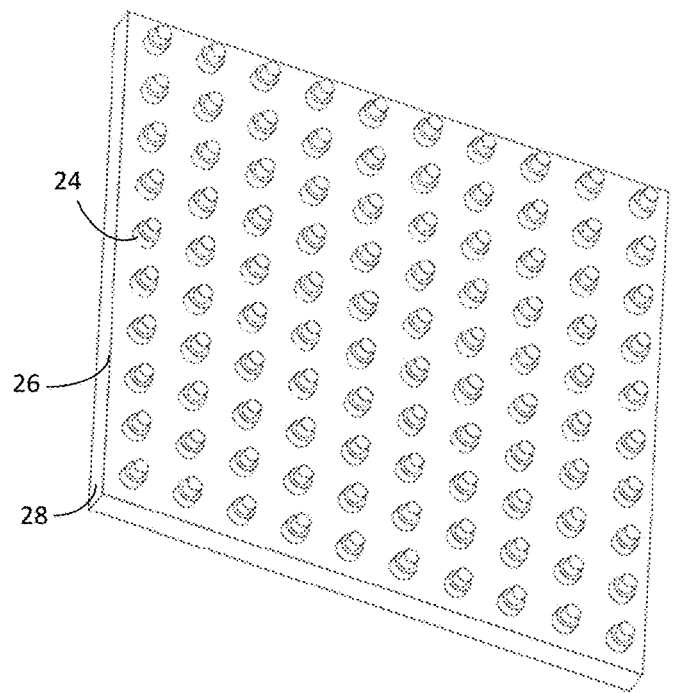
FIG. 3 shows an example of a uniform array without clusters.
Figure 4A:
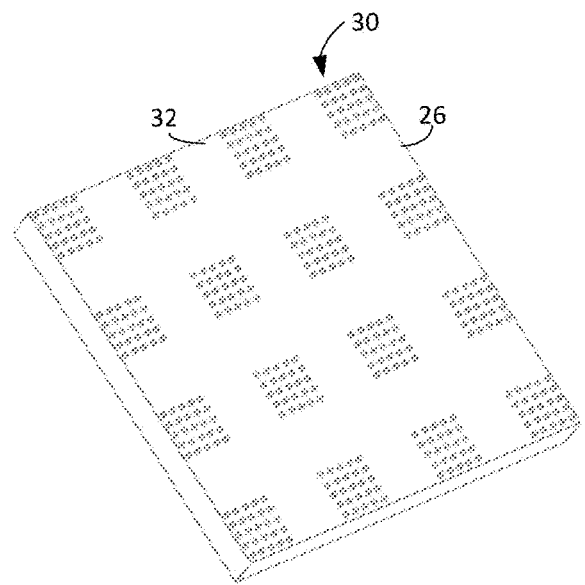
FIGS. 4A and 4B shows examples of cluster shapes and how $$\frac{land}{sea}$$
Figure 4B:
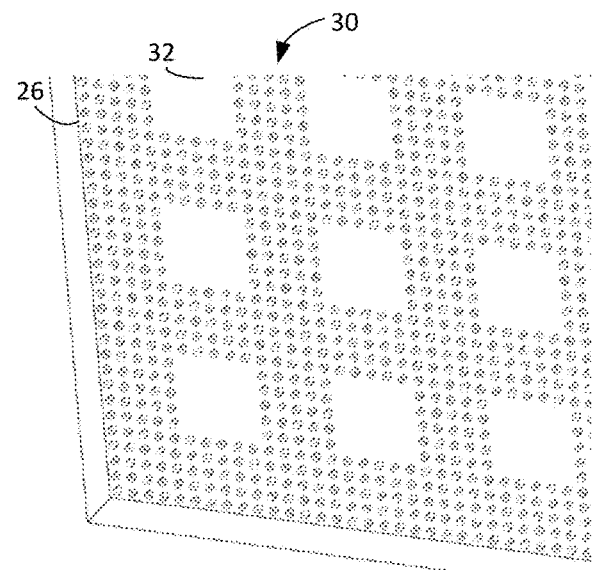

Referring to FIG. 3, a uniform array of pillars 24 is shown generally evenly distributed across a surface 26 of the substrate 28. Referring to FIGS. 4A and 12, the pillars are arranged in clusters 30 where the surface 26 of the substrate can surround each cluster to provide for a land (pillars) arrangement surrounding by sea (non-pillars) 32. Referring to FIGS. 4B and 11, the pillars 30 can be arranged in a contiguous arrangement so that the surface 26 of the substrate without pillars (sea) 32 can be surrounded by pillars (land) 30. In one embodiment, the pillars comprise a range of 25% to 75% of the total area of the surface of the substrate. The sea can be greater than 50% of the substrate surface in one embodiment.

Referring to FIG. 5, pillars can be arranged in a triangular cluster wherein each cluster includes pillars 34(a) through 34(c). The pillars can include an apex vector (see FIG. 2, 21) that is defined from the base to the top. The apex vectors of each pillar in a triangular cluster can converge to a central point 36. A first pillar 34a can be a pillar distance 38 from a second pillar 34b. The cluster can include a cluster area 40 having a perimeter defined by the pillar in a cluster. A cluster distance 42 can be defined between a first cluster 44a and a second cluster 44b. The footprint of the clusters can be 20% less relative to the substate area. The clusters can include a contact surface defined by an aggregate of the areas of the top 46 of the clusters. The contact surface can be 60% of the substrate surface or less or 60% of the substrate surface or greater.

Referring to FIG. 6, the pillars in a cluster can define a triangular array 48. In one embodiment, the triangular array is defined by six pillars and the asymmetric features of the pillars can be oriented toward the center of the cluster. The apex vectors of the pillars in a cluster can converge to a point.

Referring to FIG. 7, the pillars in the cluster can define a generally circular footprint 50. In one embodiment, the circular footprint is defined by twelve pillars and the asymmetric features of the pillars can be oriented toward the center of the cluster. The apex vectors of the pillars in a cluster can convert to a point.

Referring to FIG. 8, the pillars in a cluster can have apex vectors that are parallel. In one embodiment, the triangular array define by the clusters can six pillars. Asymmetric features can be oriented in one direction so that the structure has more gripping force in one direction than in another direction. The gripping force can be of a first force in a first direction and second force in a second direction. The first force can be greater than the second force and the first direction can be a reciprocal to the second direction. In one embodiment, the second direction can be orthogonal to the first direction.

Referring to FIG. 9, the cluster can be arranged in rows. In a first row 52, the apex vectors of the pillars are in a first direction. A second row 54 can have pillars with apex vectors in a second direction. The first direction and the second direction can be reciprocal. In this arrangement, the surface can have gripped force in a direction parallel to the apex vectors and less of a gripping force in a direction orthogonal to the apex vectors. In this arrangement a first set of clusters can include a first slant angle in the first direction and a second set of clusters can include a slant angle in the second direction.

Referring to FIG. 10, the cluster can be arranged so that a first cluster can have a triangle footprint and a second cluster can have a circulate footprint. The apex vectors of each pillar can converge to a point within the respective cluster.

Referring to FIG. 11, a cross stripe clusters example is shown. The pillars (land) can cover 75% of the total area in one embodiment, The substrate can be made from a polypropylene film and each pillar can be about is 200 μm wide. Non-pillared areas (sea) spacing can be about 3 mm wide. Referring to FIG. 12, this embodiment shows square clusters with pillars (land) covering 25% of the total area of the substrate surface. Each pillar can be 200 about μm wide. Non-patterned area (sea) spacing is 3 mm wide.

Referring to FIG. 13, this embodiment shows ring clusters with pillars (land) covering about 60% of the total area of the substrate surface. Each pillar can be about 50 μm wide. The circular non-pillared area (sea) of the inside of the ring can be spaced about 2 mm across. Referring to FIG. 14, an embodiment with ring clusters 56 is shown. The substrate can include openings 58 that can extend through the substrate and the clusters and allow for fluid to be evacuated from one side of the substrate or film to the other. The pillars (land) can cover 60% of the total area of the substrate. Each pillar can be 50 μm wide. The openings can be 200 μm wide. The non-pillared area (sea) can have a spacing up to 2 mm wide.

Referring to FIG. 15, triangular clusters 60 of six asymmetric pillars is shown in a substate that can be a polyurethane film. Each pillar can be 20 μm wide. The clusters can be arranged in rows. Referring to FIG. 16, circular clusters of six asymmetric pillars is shown disposed on a substate made from a polyurethane film. Each pillar can be 20 μm wide.

Referring to FIG. 17, two pillars 54a and 54b that can be 70 μm in height and have a 15 μm tip diameter have a force 56 applied to the pillars. Referring to FIG. 18, show the buckling under at about a 4.5-gram load applied to the pillars. As shown the performance of the pillar 58b is subject to less bucking than that of pillar 58a.

Referring to FIG. 19, a peak pressure from a finite element analysis of pillar cluster with uniform height is shown. Referring to FIG. 20, a peak pressure from finite element analysis of pillar cluster with optimized height is shown. In one embodiment, the pillars at a perimeter of the substrate can be of a lower height than pillars more centrally located on the substrate so that the load is more event dispersed when applied to the contact surface or pillars.

In one example, use of clusters of microfeatures improves grip performance in the presence of viscous lubricants. Two micro patterns were made in polypropylene film with the same micro feature dimensions: 130 μm diameter circular pillars that are 100 μm tall, approximately the same number of micro pillars over a unit area, and the approximately the same micro contact area as shown in Table 1. Pattern H394 is a uniform array as shown in FIG. 3 and pattern H388 is square clusters that are 3 mm wide and have 25 pillars per cluster as shown in FIG. 4A. The land (with pillars) percentage is 25% and the sea percentage (without pillars) is 75%. Grouping the micro pillars in clusters improved grip to soapy skin, maintained the same grip to dry skin, and provided a visual appearance that was judged to be appealing with a high grip appearance when viewed at arm's length. The lubricants on the skin were a viscous, 50% mixture of Dawn dish soap and water. Following is a comparison of uniform array and square cluster array shown in Table 1.

TABLE 1

| Micro pattern ID | Pillar shape, diameter | Pillar height | Percent micro contact (%) | Array Type, Land/Sea (%) | Grip to dry skin (N) | Grip to Soapy skin (N) | Visual Aesthetic Appearance |
| --- | --- | --- | --- | --- | --- | --- | --- |
| H388 | Circular, 130 μm | 100 μm | 3.7% | Square cluster 3 mm wide, 25/75% | 51 | 28 | High Grip |
| H394 | Circular, 130 μm | 100 μm | 3.3% | Uniform, 100/0% | 53 | 24 | Smooth Surface |

In another example, use of draft angles improves buckling resistance of micro surface pillar features. A finite element study of structural buckling was conducted of three pillars of the same height and micro contact area. One pillar had vertical sides with zero draft angle. A second pillar had a uniform draft angle of 10 degrees, and the third has an asymmetric draft angle of 5 degrees and 15 degrees. The pillars were modeled using polypropylene as the material and subjected to a load of 4.54 grams. FIG. 17 shows a finite element simulation image of the Pillar ID A (no draft angle) and Pillars ID B (10-degree draft angle) that are 70 μm tall and have a 15 μm tip diameter, made of polypropylene showing the direction of the load being applied. FIG. 18 shows a finite element simulation image of the Pillar ID A (no draft angle) and Pillars ID B (10-degree draft angle) where bucking is occurring in the pillar without a draft angle. Following is a comparison of pillars with no draft angle, uniform draft angle and asymmetric draft angle as shown in Table 2.

TABLE 2

| Pillar ID | Pillar shape, top diameter | Pillar height | Draft Angle Type | Draft Angle (degrees) | Occurrence of buckling under 4.54 gram load? |
|---|---|---|---|---|---|
| A | Circular, 15 µm | 70 µm | symmetric | 0 | Yes |
| B | Circular, 15 µm | 70 µm | symmetric | 10 | No |
| C | Circular, 15 µm | 70 µm | asymmetric | 5, 15 | No |

Under a vertical or a lateral load, the pillars with a draft angle can sustain a higher force without buckling than a pillar with the same micro contact area and no draft angle. Modeling may be used to optimize height, micro contact area, draft angles, draft angle asymmetry and choice of materials of single pillars or a cluster of pillars.

In one example, optimization of the $$\frac{land}{sea}$$

ratio can improve performance of single pillar micro patterns compared to hierarchical designs. Micro patterns were made in polypropylene film and compared for grip to dry skin and to skin covered with canola vegetable oil. The patterns are described in Table 3. Patterns H389 and H390 use the same design of micro pillars but are arranged in clusters with different $$\frac{land}{sea}$$

ratio. H390 (75% land) performed better than H389 (44% land) even though H390 had a higher micro contact ratio. Pattern H391A is a two-level hierarchical design with twice the height of the other patterns. Taller pillars often are needed to achieve grip when viscous lubricants are present. In this case, pattern H391A performs better than H389 even though both have a similar micro contact percentage.

$$\frac{land}{sea}$$

Optimization of the ratio of the clusters design in pattern H390 gives better performance than the taller, lower contact percentage, pattern H391A which uses a uniform array. H390 also has an improved visual appearance compared to H391A. Table 3 shows a comparison of uniform array and square cluster arrays with different land/sea ratios.

TABLE 3

| Micro pattern ID | Pillar shape, diameter | Pillar height | Percent micro contact (%) | Array Type, Land/Sea | Grip to dry skin (N) | Grip to Oily skin (N) | Visual Aesthetic Appearance |
|---|---|---|---|---|---|---|---|
| H389 | Circular, 130 µm | 100 µm | 6.6% | Square cluster 3 mm wide, 44/66% | 50 | 28 | High Grip |
| H390 | Circular, 130 µm | 100 µm | 11.0% | Cross stripe 3 mm wide 75/25% | 60 | 58 | High Grip |
| H391A | Circular, 130 + 200 µm | 200 µm (100 + 100) | 5.3% | Uniform 100/0% | 58 | 54 | Smooth Surface |

In another example, use of draft angles improves grip performance under conditions of high load. Polypropylene films were made of two micro patterns with the same tip diameter, height and pitch but with different pillar vertical cross section geometry. Pattern H391A has no draft angles and is a two-level pattern with a smaller diameter pillar (130 µm) stacked on a larger diameter pillar (200 µm) with the diameter change occurring at one-half of the overall height of the pillar. This is the same geometry as shown in FIG. 3. H391E has the same tip diameter (130 µm) and has a 10-degree draft angle. When friction is measured at low loads the performance of the two patterns is equivalent. However, at high loads H391E performs better than H391A. Table 4 shows grip testing of the polypropylene films against 40 Shore A hardness EPDM rubber wet with water under a load of 275 kPa (40 psi or 2.75 bar). Note that the load pressure of 275 kPa is slightly higher than the load pressure of a car tire on the road. Pressures of this magnitude and higher are experienced in medical balloons and jaws of medical gripping devices. The design with draft angles (H391E) gave better performance expressed as coefficient of friction (COF) or lateral shear force. Table 4 shows the grip of micro surfaces is one pattern having single pillar and draft angle compared to another pattern having a two-level design.

TABLE 4

| Micro pattern ID | Pillar shape, top diameter | Pillar height | Draft Angle Type | Draft Angle (degrees) | Wet grip of PP film to 40 Shore A EPDM rubber (COF) | Wet grip PP film to 40 Shore A EPDM rubber (shear kg force) |
|---|---|---|---|---|---|---|
| H391A | Circular, 130 + 200 μm | 200 μm (100 + 100) | symmetric | 0 | 1.24 | 22.6 |
| H391E | Circular, 130 | 200 μm | symmetric | 10 | 1.40 | 25.5 |

In another example, use of a micro pattern with single pillars, draft angles, through holes and a cluster array gives better performance than a two-level hierarchical micro pattern with through holes. Thermoplastic polyurethane films were made with micro patterns H477AP (two level stacked, hierarchical pattern in uniform array with through holes) and H534AP(single pillars with draft angles in ring clusters with through holes) and tested for grip against wet raw beef flank steak with the pull direction aligned with the muscle fibers. A micro photograph of pattern H534AP is shown in FIG. 14. The cluster array pattern performed better than the hierarchical pattern as shown in Table 5. This table shows the grip of micro surfaces of a first pattern compared to a second pattern.

TABLE 5

| Micro pattern ID | Pillar shape, top diameter | Pillar height | Draft Angle Type | Draft Angle (degrees) | Wet grip of TPU film to wet beef flank steak (gram force) |
|---|---|---|---|---|---|
| H477AP | Circular stacked pillars in uniform array, 10 + 200 μm with 200 μm through holes | 70 μm (50 + 20) | symmetric | 0 | 455 |
| H534AP | Circular drafted pillars in ring cluster, 25 μm with 200 μm through holes | 100 μm | symmetric | 10 | 965 |

In another example use of pillars with variable height in a cluster improves uniformity of the pressure distribution. Peaks of pressure occurring during friction can exceed the failure strength of the materials leading to tearing, abrasion and trauma. This limits that the conditions of allowable use and the grip performance that can be obtained. Finite element modeling can be used to optimize the heights of the pillars in a cluster so that the peak pressures are lower and more uniform. A finite element study was performed comparing a cluster of nine pillars made of polypropylene contacting a smooth surface of silicone rubber. FIGS. 19 and 20 show the graphical output of the finite element analysis. Table 6 shows that increasing the height of the center pillar by 5% reduces the peak pressure occurring at the outer edge of the cluster by 18%. This indicates that by optimizing heights of features within a cluster, tearing, abrasion, and trauma can be reduced while maximizing the grip force that can be developed. Use of draft angles and asymmetric draft angles may be used to further optimize performance. The individual pillars in a cluster each may be a single pillar as shown here, or they may be stacked or hierarchical structures. The following table 6 is a comparison of uniform height and variable height pillars in a cluster.

TABLE 6

| Micro pattern ID | Pillar shape, top diameter (μm) | Pillar height (μm) | Materials | Load on cluster (kPa) | Maximum peak pressure (N) | Maximum peak pressure (%) |
|---|---|---|---|---|---|---|
| Equal height | circle, 10 μm | 20 | Polypropylene gripping silicone rubber | 138 | 44 | 100% |
| Modifed height | circle, 10 μm | 20 for 8 outer pillars; 21 for center pillar | Polypropylene gripping silicone rubber | 138 | 36 | 82% |

What is claimed is:

1. A gripping surface for manufactured articles comprising:
   a first pillar, having a first apex vector and disposed on the manufactured article;
   a first draft angle defined by a first side of the first pillar and a surface of a substrate;
   a second draft angle defined by a second side of the first pillar;
   a second pillar having a second apex vector wherein the first apex vector and the second apex vector are configured to converge;
   a first cluster defined by the first pillar and the second pillar;
   a second cluster wherein a cluster distance between the first cluster and the second cluster is greater than a distance between the first pillar and the second pillar
   a cluster footprint defined by the first cluster and the second cluster wherein the cluster footprint and an area occupied by the cluster footprint is 80% or less relative to a substrate area; and,
   a contact surface defined by an aggregate of the tops of each pillar wherein the contact surface that is less than 25% of a substrate surface.

2. The surface of claim 1 wherein two or more pillars combine to provide a contact surface with a pull force greater than 50 newtons according to a pull test.

3. The surface of claim 1 including a third pillar having a third apex vector wherein the first apex vector, the second apex vector and the third apex vector define a triangular pillar array.

4. The surface of claim 3 wherein:
   the triangular pillar array is an inner triangular pillar array; and,
   an outer triangular pillar array is defined by a set of outer pillars each having an outer draft angle wherein the outer draft angle is equal or larger than any one of the first draft angle, the second draft angle and a third draft angle.

5. The surface of claim 1 wherein the first cluster, the second cluster and a third cluster define a circular footprint.

6. A gripping surface for manufactured articles comprising:
   a first pillar, having a first apex vector and disposed on the manufactured article; a first draft angle defined by a first side of the first pillar and a surface of a substrate;
   a second draft angle defined by a second side of the first pillar;
   a second pillar having a second apex vector wherein the first apex vector and the second apex vector are configured to converge;
   a first cluster defined by the first pillar and the second pillar;
   a second cluster wherein a cluster distance between the first cluster and the second cluster is greater than a distance between the first pillar and the second pillar
   a cluster footprint defined by the first cluster and the second cluster wherein the cluster footprint and an area occupied by the cluster footprint is 80% or less relative to a substrate area; and,
   a void defined by a plurality of clusters wherein the void is less than 50% of a substrate surface.

7. The surface of claim 6 wherein the void surrounds a set of clusters.

8. A gripping surface for manufactured articles comprising:
   a first pillar, having a first apex vector and disposed on the manufactured article; a first draft angle defined by a first side of the first pillar and a surface of a substrate;
   a second draft angle defined by a second side of the first pillar;
   a second pillar having a second apex vector wherein the first apex vector and the second apex vector are configured to converge;
   a first cluster defined by the first pillar and the second pillar;
   a second cluster wherein a cluster distance between the first cluster and the second cluster is greater than a distance between the first pillar and the second pillar
   a cluster footprint defined by the first cluster and the second cluster wherein the cluster footprint and an area occupied by the cluster footprint is 80% or less relative to a substrate area; and,
   wherein the first pillar is in a range of 15 μm to 300 μm in diameter.

9. A gripping surface for manufactured articles comprising:
   a first pillar, having a first apex vector and disposed on the manufactured article; a first draft angle defined by a first side of the first pillar and a surface of a substrate;
   a second draft angle defined by a second side of the first pillar;
   a second pillar having a second apex vector wherein the first apex vector and the second apex vector are configured to converge;
   a first cluster defined by the first pillar and the second pillar;
   a second cluster wherein a cluster distance between the first cluster and the second cluster is greater than a distance between the first pillar and the second pillar
   a cluster footprint defined by the first cluster and the second cluster wherein the cluster footprint and an area occupied by the cluster footprint is 80% or less relative to a substrate area; and,
   wherein the first pillar is 300 microns or less in height.

10. A gripping surface for manufactured articles comprising:
    a first pillar, having a first apex vector and disposed on the manufactured article; a first draft angle defined by a first side of the first pillar and a surface of a substrate;
    a second draft angle defined by a second side of the first pillar;
    a second pillar having a second apex vector wherein the first apex vector and the second apex vector are configured to converge;
    a first cluster defined by the first pillar and the second pillar;
    a second cluster wherein a cluster distance between the first cluster and the second cluster is greater than a distance between the first pillar and the second pillar
    a cluster footprint defined by the first cluster and the second cluster wherein the cluster footprint and an area occupied by the cluster footprint is 80% or less relative to a substrate area; and,
    wherein a set of clusters disposed on the substrate define a cluster footprint, and a ratio of the cluster footprint is in a range of 25% to 85% relative to a substrate area.

11. A gripping surface for a manufactured article comprising:

a first pillar, having a first apex vector and disposed on the manufactured article; a first draft angle defined by a first side of the first pillar and a substrate;

a second draft angle defined by a second side of the first pillar and the substrate wherein the second draft angle is equal or less than the first draft angle;

a second pillar having a second apex vector wherein the first apex vector and the second apex vector are parallel;

a first cluster defined by the first pillar and the second pillar and having a first cluster slant angle;

a pillar distance defined between the first pillar and the second pillar;

a second cluster disposed at a distance from the first cluster greater than the pillar distance and having a second slant angle, and, wherein the first cluster slant angle and a second cluster slant angle sum to about 180 degrees.

12. The surface of claim 11 wherein a combination of pillars are configured to have a higher grip force in a first direction and a lower grip force in a second direction.

13. The surface of claim 11 comprising:

including a first cluster defined by the first pillar and the second pillar and having a first cluster slant angle;

a pillar distance defined between the first pillar and the second pillar;

a second cluster disposed at a distance from the first cluster greater than the pillar distance;

a second cluster slant angle parallel to the first cluster slant angle.

14. The surface of claim 11 including an opening extending through the manufactured article.

15. A gripping surface for a manufactured article comprising:

a first pillar, having a first apex vector and disposed on the manufactured article; a first draft angle defined by a first side of the first pillar and a substrate;

a second draft angle defined by a second side of the first pillar and the substrate wherein the second draft angle is equal or less than the first draft angle;

a second pillar having a second apex vector wherein the first apex vector and the second apex vector are parallel;

wherein the first pillar is disposed at an edge of the manufactured article and has a first pillar height;

the second pillar is disposed on an interior of the manufactured article and includes a second pillar height; and, wherein the first pillar height is less than the second pillar height.

16. A gripping surface for a manufactured article comprising:

a first pillar cluster disposed on a substate carried by the manufactured article and having:

a first pillar, having a first apex vector and a first draft angle defined by a first side of the first pillar and a substrate; a second draft angle defined by a second side of the first pillar and the substrate wherein the second draft angle is less than the first draft angle; and, a second pillar having a second apex vector wherein the first apex vector and the second apex vector are parallel;

wherein the first pillar cluster has a triangular orientation; and, a second pillar cluster having:

a first set of pillars arranged in a first concentric circle; and, a second set of pillars arranged in a second concentric circle wherein the first pillar cluster and the second pillar cluster cover less than 25% of the article.

17. The surface of claim 16 wherein the first pillar has a height of 300 µm or less relative to the substrate and a land to sea ratio ration of 1:3 or less.

* * * * *